(12) United States Patent
Kumar et al.

(10) Patent No.: US 12,483,639 B2
(45) Date of Patent: Nov. 25, 2025

(54) 5G INTERFACE HANDLER FOR LEGACY SYSTEMS

(71) Applicant: Oracle International Corporation, Redwood City, CA (US)

(72) Inventors: Santosh Kumar, Bengaluru (IN); Gaurav Agnihotri, Bengaluru (IN); Rahul Sharma, Bengaluru (IN); Anubhav Dutta Choudhury, Silcar (IN); Charvi Ballal, Mysore (IN)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 18/419,318

(22) Filed: Jan. 22, 2024

(65) Prior Publication Data

US 2025/0175543 A1 May 29, 2025

(51) Int. Cl.
*H04L 69/22* (2022.01)
*H04L 1/00* (2006.01)

(52) U.S. Cl.
CPC ............ *H04L 69/22* (2013.01); *H04L 1/0041* (2013.01)

(58) Field of Classification Search
CPC ........ H04L 69/22; H04L 69/18; H04L 1/0041
USPC ........................................................ 709/224
See application file for complete search history.

(56) References Cited

U.S. PATENT DOCUMENTS

| | | | | |
|---|---|---|---|---|
| 2014/0036309 | A1* | 2/2014 | Oguma | G06F 3/1288 358/1.15 |
| 2019/0268269 | A1* | 8/2019 | Connor | G06F 9/455 |
| 2021/0014338 | A1* | 1/2021 | Lamb | H04L 69/18 |
| 2022/0053375 | A1* | 2/2022 | Asawa | H04W 72/0453 |
| 2022/0247595 | A1* | 8/2022 | Hung | H04L 12/40032 |
| 2023/0006889 | A1* | 1/2023 | Thyagaturu | H04L 41/5054 |
| 2023/0017184 | A1* | 1/2023 | Balmakhtar | H04W 80/10 |
| 2023/0103816 | A1* | 4/2023 | Trujillo | H04L 41/0895 370/328 |

FOREIGN PATENT DOCUMENTS

| | | | | |
|---|---|---|---|---|
| CN | 111835802 A | * | 10/2020 | ......... H04L 67/1097 |
| CN | 213244051 U | * | 5/2021 | |
| WO | WO-2022133330 A1 | * | 6/2022 | .............. B22F 10/70 |

OTHER PUBLICATIONS

Machine Translation of CN 111835802 A (Year: 2020).*

* cited by examiner

*Primary Examiner* — Ruolei Zong

(57) ABSTRACT

Various embodiments of the present technology generally relate to systems and methods for providing an interface to securely handle messages from 5G services for network monitoring purposes. In an example, a packet encoder is provided as an interface handler. The packet encoder may receive from one or more network functions (NFs) in a communication exchange on a 5G network, an input including a plurality of messages. Upon receipt, the packet encoder may determine an input format from the input and determine an output format for a feed generated based on the plurality of messages. The packet encoder may also translate the plurality of messages from the input format to the output format, where the input format is different than the output format, and the feed includes the plurality of messages in the output format. The packet encoder may then transmit the feed to a network monitoring system.

20 Claims, 13 Drawing Sheets

5G INTERFACE HANDLER FOR LEGACY SYSTEMS

RELATED APPLICATION

This application claims the benefit and priority to Indian provisional patent application number 202341080956, filed Nov. 29, 2023, entitled "5G INTERFACE HANDLER FOR LEGACY SYSTEMS," which is incorporated herein by reference in its entirety for all purposes.

TECHNICAL FIELD

Various embodiments of the present technology generally relate to the integration of 5G communications into legacy systems within the environment of communications networks. More specifically, embodiments of the present technology relate to systems and methods for providing an interface to securely handle messages from 5G services for network monitoring purposes.

BACKGROUND

In the realm of telecommunications, the advent of 5G technology has ushered in a new era of connectivity and data transfer speeds. Communication service providers (CSPs), however, are challenged with securely and adequately optimizing the network performance to include 5G data. One problem that CSPs encounter is gathering data from both 5G and non-5G services. As is appreciated by those skilled in the art, infrastructure, spectrum usage, and deployment strategies required for 5G are substantially different, making it challenging to seamlessly apply the principles of 3G and 4G systems to the intricacies of 5G communications.

Another problem that CSPs encounter with the introduction of 5G data and services is securely and adequately optimizing and safeguarding data communicated within the network. Currently, network monitoring systems, such as monitoring probes and applications, are used to ensure the efficiency and security of data exchanged within a given network. Network monitoring systems act as vigilant observers, continuously monitoring network performance, traffic patterns, and potential vulnerabilities. By collecting real-time data and metrics, they empower service providers to optimize network functionality, identify and rectify issues promptly, and enhance the overall user experience. Moreover, monitoring applications leverage the data generated by these probes to offer innovative solutions, such as predictive maintenance, network slicing optimization, and quality-of-service enhancements.

As 5G networks become increasingly complex and dynamic, the deployment of robust network monitoring systems becomes imperative, serving as indispensable tools in maintaining the reliability and resilience of next-generation telecommunications infrastructure. Currently, CSPs encounter challenges with network monitoring systems being unable to efficiently or even completely incorporate 5G data into their systems. The inability for network monitoring systems to accommodate 5G data effectively causes issues for CSPs, such as troubleshooting issues, analyzing data usage of the 5G core, and utilizing existing applications (e.g., applications used for 3G/4G data). Accordingly, there exists a need for improved network handling mechanisms to interface between 5G services and network monitoring systems.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing an interface handler. An interface handler, as provided herein, provides one or more functions for facilitating the seamless capture and transmission of 5G messages into legacy systems, specifically network monitoring systems. In one example, the interface handler includes a packet encoder that receives 5G messages from one or more 5G network (NFs) and modifies the format of the message into a format that is receivable by a network monitoring system. That is, the packet encoder may receive a 5G message containing data in a JSON (JavaScript Object Notation) format for transmission via a HTTP/2 protocol and translate the 5G message into a network wire format for transmission via a TCP/IP protocol that is receivable by a network monitoring system.

In another example, the interface handler includes a data director (DD), as described herein. The DD interfaces between the 5G core network and network monitoring systems by modifying the message format of the 5G messages, along with providing various microservices to streamline any analysis performed on the 5G messages. As will be described in greater detail below, the DD may provide various microservices, such as 5G traffic feed aggregation, data enrichment, data filtering, data replication, and secure transport (e.g., Transport Layer Security, TLS). In some embodiments, the interface handler may include both a DD and a packet encoder to provide seamless integration between the 5G core network and the network monitoring systems.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
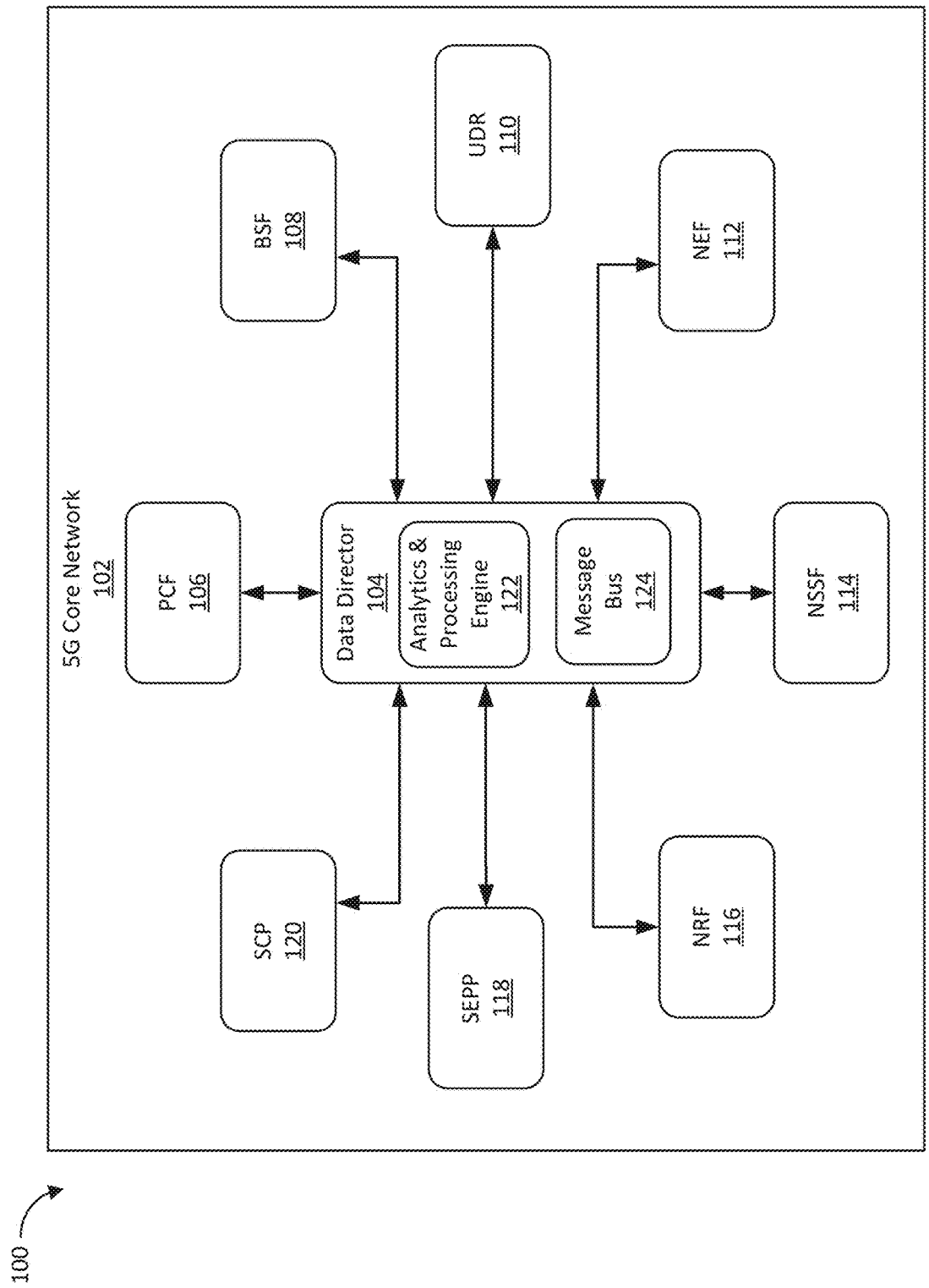
FIG. 1 illustrates an example operational environment for a system for providing one or more features of an interface handler, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

With the introduction of 5G data and related services, CSPs are challenged with integrating this new method of communication with legacy systems and architectures. In particular, challenges arise in providing an effective interface between 3G and 4G systems and applications with the advanced 5G network. Challenges arise primarily from fundamental differences in architecture and underlying technologies. While 5G networks are designed to be backward compatible to some extent, the radical leap in capabilities and network architecture poses obstacles for seamless integration with older technologies. The ultra-low latency, high data rates, and massive device connectivity capabilities of 5G demand a new infrastructure that is not fully compatible with the more rigid and less efficient structures of 3G and 4G. Legacy systems often lack the agility and flexibility required to fully harness the potential of 5G, limiting their ability to coexist seamlessly. As a result, the transition to 5G often necessitates infrastructure upgrades, making it challenging for 3G and 4G applications to interface effectively without substantial modifications or replacements. The incompatibility arises from the divergent paths of technological evolution, emphasizing the importance of comprehensive planning and adaptation for a successful integration of 5G into the existing communication landscape.

One area in which the difficulties of interfacing the 5G network with legacy systems is emphasized is the interface between existing network monitoring systems and the 5G network. As described above, network monitoring systems, such as monitoring applications and probes, play a crucial role in ensuring that communications exchanged on a network are efficient and secure. Network monitoring systems continuously monitor network performance and traffic patterns to identify potential vulnerabilities within the network. Moreover, the real-time data collected by network monitoring systems provide CSPs with information critical for optimizing network functionality and troubleshooting issues as they arise, both of which are necessary for providing a good user experience. As such, without an appropriate interface between the 5G network and network monitoring systems CSPs are vulnerable and unable to address issues as they arise in a timely manner.

An example challenge faced by CSPs with providing an interface between network monitoring systems and 5G technologies is network visibility. As part of the network optimization process, CSPs have historically securely extracted raw data from messages and provided that data to network monitoring systems. That is, capture tools used by CSPs to gather data during exchanges have relied on access to encryption keys to show the decrypted information within a respective message (e.g., data packet). 5G technologies, however, require TLS1.2 and TLS1.3 (Transport Layer Security 1.2 and 1.3, respectively) which impedes access to encryption keys. As such, there is difficulty with capturing 5G data and providing it to network monitoring systems. As those in the art readily appreciate, there are many other challenges that arise from the integration of the 5G technologies into legacy systems and architecture.

To facilitate integration of 5G technologies into legacy systems, in particular, into established network monitoring systems, example systems and techniques for providing an interface handler are provided herein. As will be described in greater detail below, the interface handler can include one or more features that facilitate seamless capture and transmission of 5G data into legacy systems, such as network monitoring systems. In one embodiment, the interface handler includes a HTTP/2 (Hypertext Transfer Protocol/2) packet encoder that receives 5G HTTP/2 messages from one or more 5G network functions (NFs) and modifies the format into a format that is capable of transmission over a TCP/IP (Transmission Control Protocol/Internet Protocol) connection. A common format for data within HTTP/2 messages, in particular for applications or providers involving a cloud environment, is JSON (JavaScript Object Notation). In contrast, a common format for data transmitted over a TCP/IP connection is a network wire format. As such, there is a need for an interface handler that can encode 5G HTTP/2 messages from JSON format to a network format.

Another example of where the HTTP/2 packet encoder, provided herein, facilitates integration of 5G technologies into legacy systems is the handoff of 5G SBI (Service Based Interface) messages to legacy systems. For example, 5G SBI messages often use HTTP/2 protocol with JSON as an application layer serialization protocol. In contrast, legacy systems generally require network wire format using a TCP/IP connection with Layer2-Layer 7 support. As those skilled in the art readily appreciate, Layer2-Layer7 refers to the OSI (Open Systems Interconnection) model, which is a conceptual framework used to handle network interactions. Each layer in the OSI model has a specific function and requires specific information be included: Layer 2 (Data Link Layer), Layer 3 (Network Layer), Layer 4 (Transport Layer), Layer 5 (Session Layer), Layer 6 (Presentation Layer), and Layer 7 (Application Layer).

In another embodiment, the interface handler includes a data director. As will be described in greater detail below, the data director is a network traffic analysis entity deployed in the 5G core network to provide an interface between 5G communications and network monitoring systems. For example, the data director captures 5G data and provides the captured data through standardized (e.g., legacy) interfaces to network monitoring systems while maintaining security. In some cases, the data director may include the HTTP/2 packet encoder to facilitate exchange of message formats between the 5G NFs and the network monitoring systems.

In addition to providing an interface between the 5G network and network monitoring systems, the data director allows CSPs to perform necessary data analytics on the captured data to ensure network integrity and provide improved user experience. As will be described in greater detail below, the data director provides various microservices that allow CSPs to analyze inbound and outbound communications. For example, the data director provides for 5G traffic feed aggregation, data enrichment, data filtering, data replication, and secure transport (TLS) to CSPs.

Turning now to the Figures, FIG. 1 illustrates an example operational environment for a system 100 for providing one or more features of an interface handler, according to an embodiment herein. The example system 100 includes a network including a 5G core (5GC) cellular network 102 implementing 3GPP (3rd Generation Partnership Project) communication standards, although the present disclosure may apply to other communication networks.

Each or any of 5GC 102, its components, and their sub-components may be implemented via computers, servers, hardware and software modules, or other system components. The components of 5GC network 102 and its subcomponents, or the physical devices implementing them, may be co-located, remotely distributed, or any combination thereof. The elements of system 100 may include components hosted or situated in the cloud and implemented as software modules potentially distributed across one or more server devices or other physical components.

The 5GC network 102 includes a plurality of example components, nodes, or network functions (NFs), such as Policy Control Function (PCF) 106, Binding Support Function (BSF) 108, User Data Repository (UDR) 110, Network Exposure Function (NEF) 112, Network Slice Selection Function (NSSF) 114, Network Repository Function or NF Repository Function (NRF) 116, Security Edge Protection Proxy (SEPP) 118, or Service Controller Proxy or Service Communications Proxy (SCP) 120. The selection of NFs 106-120 depicted in system 100 is exemplary, and some of the NFs 106-120 may be excluded, or other NFs added to the collection, without departing from the scope of this disclosure. The various NFS 106-120 execute various operations to provide communication services to user equipment (UE) that connects to 5GC network 102. A network node or NF that provides service is referred to herein as a producer NF, while a network node or NF that consumes services is referred herein to as a consumer NF. A network function can be both a producer NF and a consumer NF depending on whether it is consuming or providing service.

The NFs 106-120 of the 5GC network 102 exchange various communications in the course of providing network services. The communications may include messaging to establish or end secured communication channels, such as transport layer security (TLS) handshakes, as well as service-based interface (SBI) communications. As used herein, SBI is the term given to the application programming interface (API) based communication that can take place between two NFs within the 5G SBA (Service Based Architecture). A given NF can utilize an API call over the SBI to invoke a particular service or service operation. Communications between NFs 106-120 may be performed over network links and communication channels of 5GC network 102 that are not explicitly depicted in system 100.

In the illustrated example, the 5GC network 102 includes an interface handler, specifically a data director (DD) 104. The DD 104 is a network traffic analysis entity deployed in the 5GC network 102. The DD 104 may receive a copy of traffic feeds from the NFs 106-120 deployed in the network 102 and may analyze the traffic and provide feedback to the NFs. An example DD 104 includes an Oracle® Communications Network Analytics Data Director (OCNADD), although other implementations of a DD are encompassed by this disclosure. The DD 104 may receive a copy of all communication traffic between NFs 106-120, or only certain types or categories of communications, such as SBI traffic. The examples provided herein may focus on implementations in which the NFs 106-120 send a copy of SBI traffic to the DD 104, although other implementations are possible.

The data director 104 may include a message bus 124 to manage incoming traffic and outgoing responses or feedback, and an analytics and processing engine 122 to evaluate received traffic and messages, and to formulate feedback or notifications to provide back to NFs 106-120. In some cases, the message bus 124 may be a message broker. As noted above, the data director 104 provides various microservices that facilitate the mirroring of 5G messages exchanged on the 5GC network 102 for transmission to network monitoring systems. The data director 104 is described in greater detail below with respect to FIGS. 6-8. In particular, the various microservice modules present within the data director 104 are described in greater detail in these Figures.

When NFs 106-120 communicate with each other, they send a copy of the 5G SBI traffic to the data director 104. The NFs 106-120 and the DD 104 of 5GC network 102 may be provided or controlled by one or more network operators. The NFs 106-120 may be configured by the network operator to communicate with DD 104, and vice-versa, via special secure connections or communication channels that are not used for communications between the NFs 106-120 themselves. The DD 104 may be configured with security measures or requirements, such that entities outside of the 5GC network 102 run by a network operator, such as a hacker, may not know of or have means to send messages to DD 104.

Figure 2A:
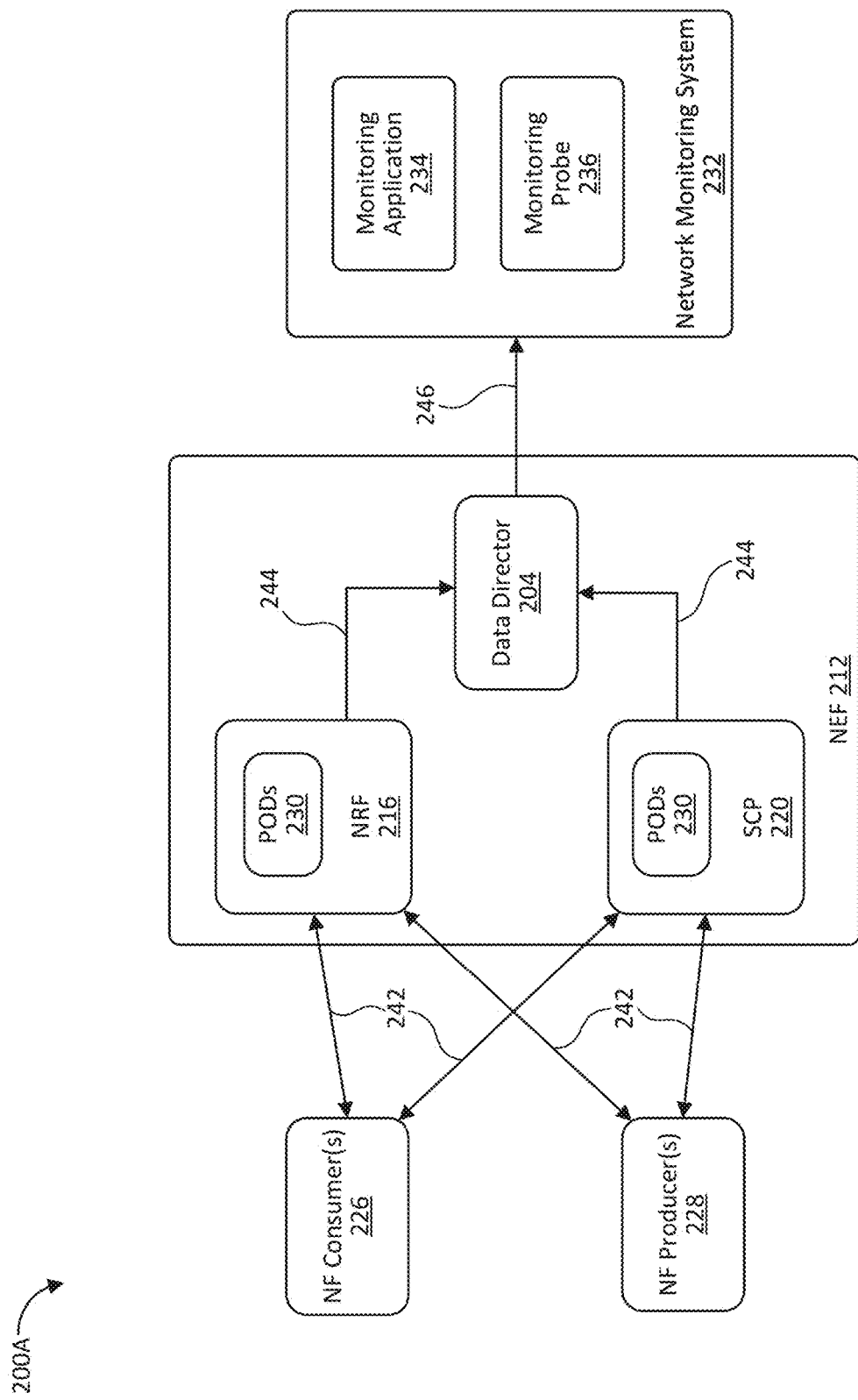
FIGS. 2A-B illustrate example environments in which an interface handler captures and directs 5G traffic to a network monitoring system, according to an embodiment herein.
Figure 2B:
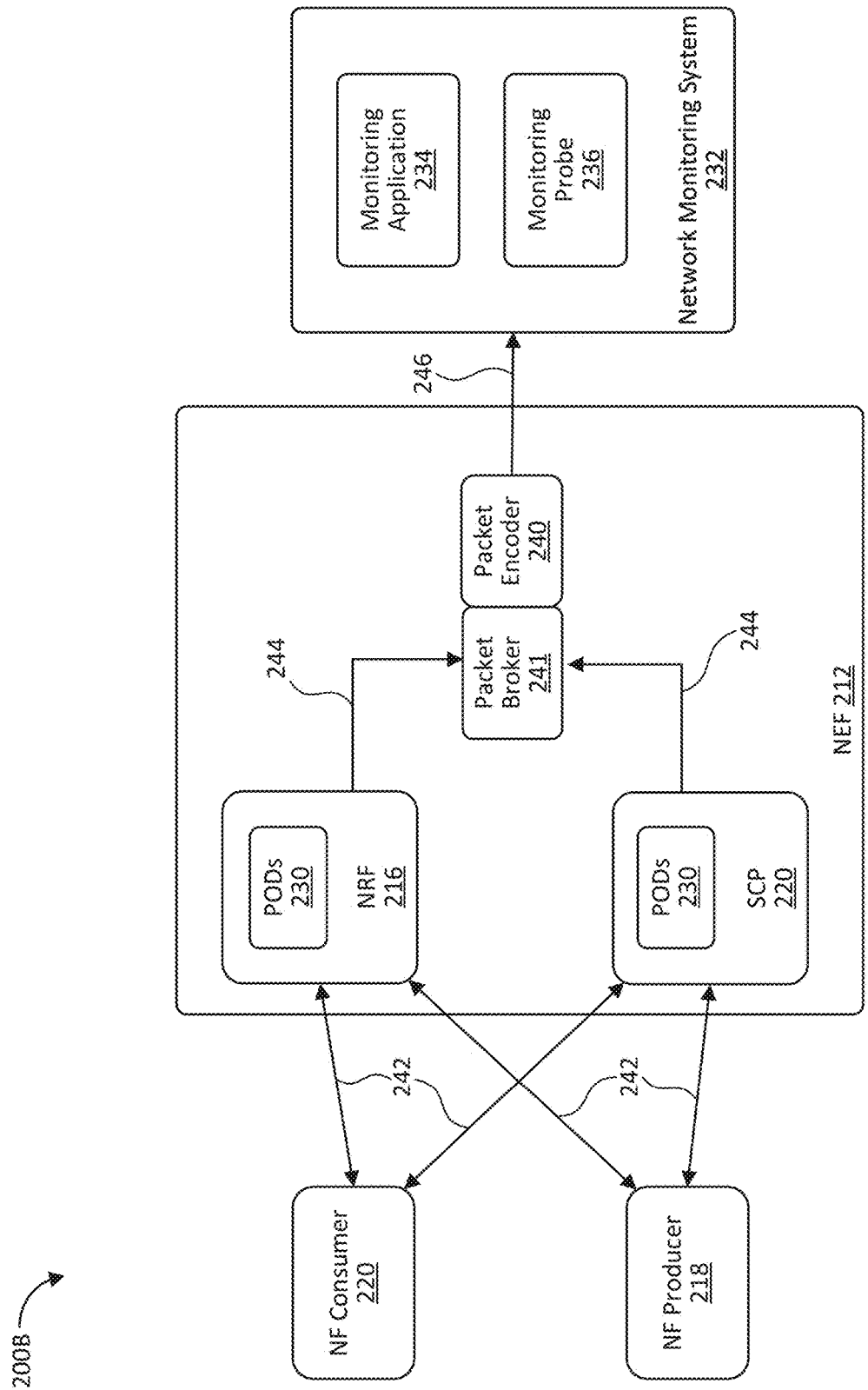

As SBI traffic is received, the DD 104 may send some or all of the traffic to one or more network monitoring systems. Referring now to FIGS. 2A and 2B, example environments in which an interface handler captures and directs 5G traffic to a network monitoring system are illustrated. For ease of discussion, FIG. 2A provides an environment 200A in which the interface handler is a DD 204, which may be the same or similar to the DD 104, and FIG. 2B provides an environment 200B in which the interface handler is a packet encoder (PE) 240. As illustrated in both, the interface handler, the DD 204 in FIG. 2A and the PE 240 in FIG. 2B, gather communications from various 5GC NFs and provide data to network monitoring system 232.

The network monitoring system 232 provides networking monitoring services that are integral to maintaining the health, efficiency, and security of telecommunications infrastructures by providing real-time insights, diagnostics, and actionable data to network operators and administrators. As used herein, the network monitoring system 232 refers to comprehensive systems or solutions that often involve a combination of software applications, tools, and hardware probes designed to monitor, analyze, and manage the performance of a telecommunications network. As such, the network monitoring system 232 includes a monitoring application 234 and the monitoring probe 236. Although both the monitoring application 234 and the monitoring probe 236 are illustrated as part of the network monitoring system 232, various configurations are envisaged. For example, the network monitoring systems 232 may include only the monitoring application 234 or multiple monitoring applications 234. In another example, the network monitoring system 232 may include only the monitoring probe 236 or multiple monitoring probes 236.

The monitoring application 234 may include a software program or tool designed to analyze, visualize, and interpret data collected from the telecommunications network. As described above, the monitoring application 234 typically provides a user interface through which network operators or administrators can access key performance indicators, statistics, and insights into the health and performance of the network. As such, the monitoring application 234 is essential for making informed decisions about network optimization, troubleshooting, and resource allocation. For example, the monitoring application 234 may offer features such as real-time dashboards, historical data analysis, and alerts to notify operators of potential issues.

On the other hand, the monitoring probe 236 is a hardware or software component that actively collects data from the network. Monitoring probes, such as the monitoring probe 236, are strategically placed within the network infrastructure to capture information on traffic patterns, performance metrics, and other relevant data. Unlike the monitoring application 234, the monitoring probe 236 focuses on data collection and may not necessarily provide a user interface for analysis. Instead, the collected data is often fed to the monitoring application 234 for further processing and interpretation. As can be appreciated, monitoring probes 236 play a crucial role in obtaining accurate and real-time information about the network's behavior, enabling operators to detect and address issues promptly.

As described above, the interface handler facilitates integration of 5G technologies into existing network monitoring systems, such as the network monitoring systems 232, by capturing communication exchanged by one or more NFs on the 5G network, such as the 5GC network 102, and modifying the communication into a feed that is receivable by the network monitoring system 232.

In the illustrated environments 200A and 200B, the interface handlers—the DD 204 and the PE 240, respectively—are provided as part of the NEF 212. As those skilled in the art readily appreciate, the NEF 212 is a 5G Network Exposure Function that facilitates a secure access point to a 5G network, such as the 5GC network 102. Here, the NEF 212 provides the interface handler access to communications exchanged between NF consumer(s) 226 and NF producer(s) 228.

The NF consumer(s) 226 is an entity or component within the network architecture that utilizes or consumes specific network functions. For example, the NF consumer(s) 226 may be an application, service, or another NF that relies on the capabilities provided by various NFs to perform its intended task. As such, the NF consumer(s) 226 sends requests or instructions to the NFs it depends on, here the NEF 212, and expects certain services or functionalities in return.

Figure 3:
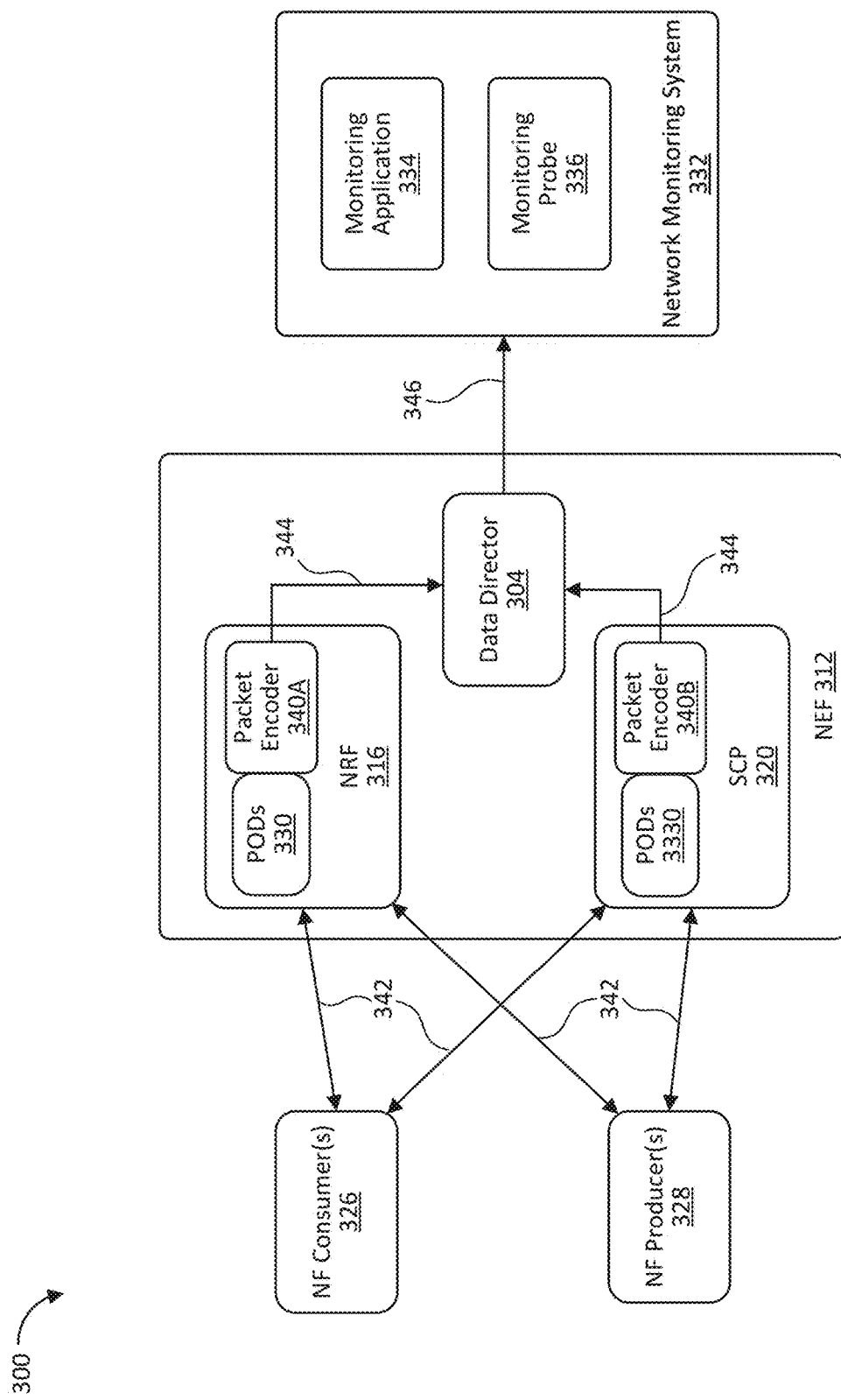
FIG. 3 illustrates another example environment illustrating an interface handler, according to an embodiment herein.

On the other end, the NF producer(s) 228 is an entity responsible for creating, hosting, or providing specific NFs within the network infrastructure. For example, the NF producer(s) 228 could be a server, a virtualized platform, or a dedicated hardware device that hosts and executes NFs. As such, the NF producer(s) 228 responds to requests from NF consumer(s) 226, executes the necessary functions, and returns the respective results. In other words, the NF consumer(s) 226 and the NF producer(s) 228 shown in FIGS. 2A-B, and the subsequent FIG. 3, illustrate the way various components interact to deliver network services, such as those provided by the NEF 212. That is, the NF consumer(s) 226 requests specific functions, and the NF producer(s) 228 provides those functions, facilitating communication, data processing, or other services within the network architecture. The consumer-producer relationship between the NF consumer(s) 226 and the NF producer(s) 228 is particularly relevant in software-defined environments, such as cloud environments, where NFs are dynamically orchestrated and virtualized to enhance flexibility and scalability in network management.

As illustrated, communications 242 between the NF consumer(s) 226 and the NF producer(s) 228 are exchanged via the NEF 212. The NEF 212 may include various NFs that handle the communications 242 exchanged between the NF consumer(s) 226 and the NF producer(s) 228. In the illustrated example, the NEF 212 includes a NRF 216, which may be the same or similar to the NRF 116, and a SCP 220, which may be the same or similar to the SCP 120. Each of the NRF 216 and the SCP 220 may include one or more PODs 230.

As communications 242 is received by one or both of the NRF 216 and SCP 220, the data traffic 244 is routed to the interface handler. Referring to FIG. 2A, traffic 244 is routed to the DD 204 as it is received by the NRF 216 and the SCP 220. Similarly, with reference to 2B, traffic 244 is routed to the HTTP/2 packet encoder 240 as it is received by the NRF 216 and SCP 220. Once the interface handler receives the traffic 244, the interface handler modifies the data into a format that is receivable by the network monitoring system 232. The various modifications that may be made to the data are described in greater detail below with reference to FIGS. 4-8. Once the interface handler modifies the data into a format that is receivable by the network monitoring system 232, the interface handler generates a feed 246 and provides the feed 246 to the network monitoring system 232.

With reference to FIG. 2B, the interface handler is the PE 240. As illustrated, the interface handler includes a packet broker 241, which may be part of or associated with the message bus 124. The packet broker 241 is a network device designed to optimize and manage the flow of network traffic 244 within a communication infrastructure. The packet broker 241 operates at the lower layers of the OSI model, typically at Layer 2 (Data Link Layer) or Layer 4 (Transport Layer). As those skilled in the art readily appreciate, the packet broker 241 performs crucial functions such as traffic filtering, load balancing, packet deduplication, and network visibility, enhancing the efficiency, security, and analysis of data packets traversing the network.

When the packet broker 241 receives the traffic 244 from one or more NFs, such as the NRF 216 and the SCP 220, the packet broker 241 provides the data from the traffic 244 to the packet encoder 240. Upon receipt of the data from the packet broker 241, the packet encoder 240 modifies the format of the incoming data into a format that is receivable by the network monitoring system 232. For example, the feed 246 may need to be in a format, such as the format illustrated in Table 1 provided below, to be receivable by the network monitoring system 232. As will be described in greater detail below, various TLS (Transport Layer Security) encryption options may be supported by the feed 246.

TABLE 1

| Transmit Packet Header | | | | Data Portion | | |
|---|---|---|---|---|---|---|
| IPv4 Header | TCP Header | Optional TLS | HTTP/2 Hdr | Mirror Received 5 G SBI Message | JSON 5 G SBI Message Headers | Metadata Added by Mirror Feed Source |

Turning now to FIG. 3, another example environment 300 illustrating an interface handler is provided, according to an embodiment herein. In environment 300, the interface handler includes both a data director 304 and two packet encoders 340A and 340B, which may be the same or similar to the DD 204 and the packet encoder 240, respectively. The environment 300 may include elements that are the same or similar to those in the environments 200A-B. For example, the environment 300 includes a NEF 312 that receives communications 342 as they are exchanged between NF consumer(s) 326 and NF producer(s) 328. In particular, the NEF 312 includes a NRF 316 and a SCP 320 that receive one or more communications 342 exchanged between the NF consumer(s) 326 and the NF producer(s) 328. Each of the NRF 316 and the SCP 320 include PODs 330 and direct traffic 344 to the DD 304. Once the DD 304 receives the traffic 344, a feed 346 is generated and transmitted to a network monitoring system 332, which may be the same or similar to the network monitoring system 232. The network monitoring system 332 includes a monitoring application 334 and a monitoring probe 336.

As illustrated, the PE 340A is part of the NRF 316 and the PE 340B is part of the SCP 320. By providing the PE 340A and 340B within a respective NF, the communications 342 are modified into a feed format (e.g., format that is receivable by the network monitoring system 332) when transmitting as part of the traffic 344 to the DD 304. As those skilled in the art may readily appreciate, it may be more efficient to modify the format of the communications 324 at the NF (here the NRF 316 and the SCP 320) before routing the traffic 344 onwards.

Figure 4:
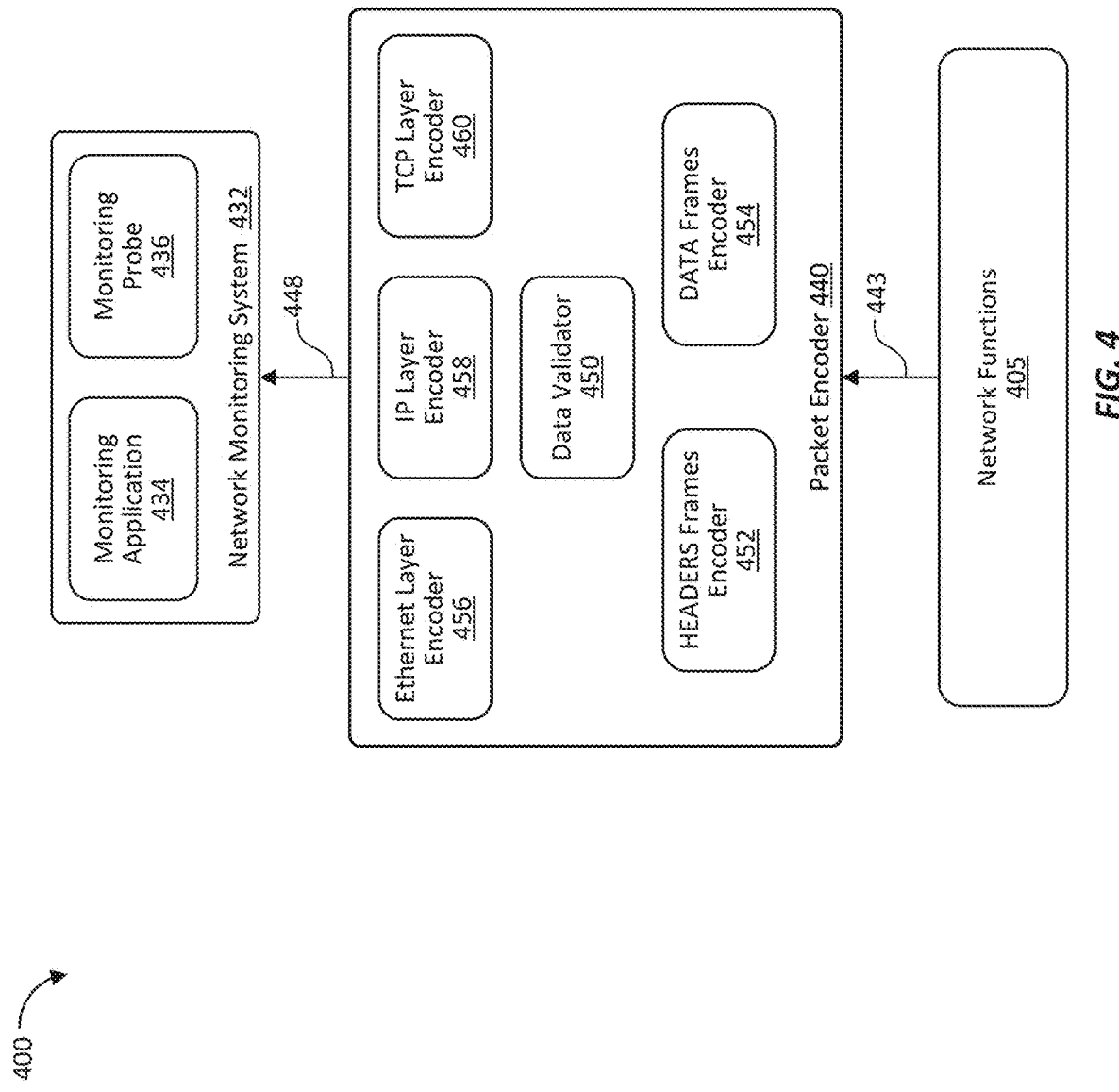
FIG. 4 illustrates an example environment including a packet encoder (PE) interfacing between network functions (NFs) and a network monitoring system, according to an embodiment herein.
Figure 5:
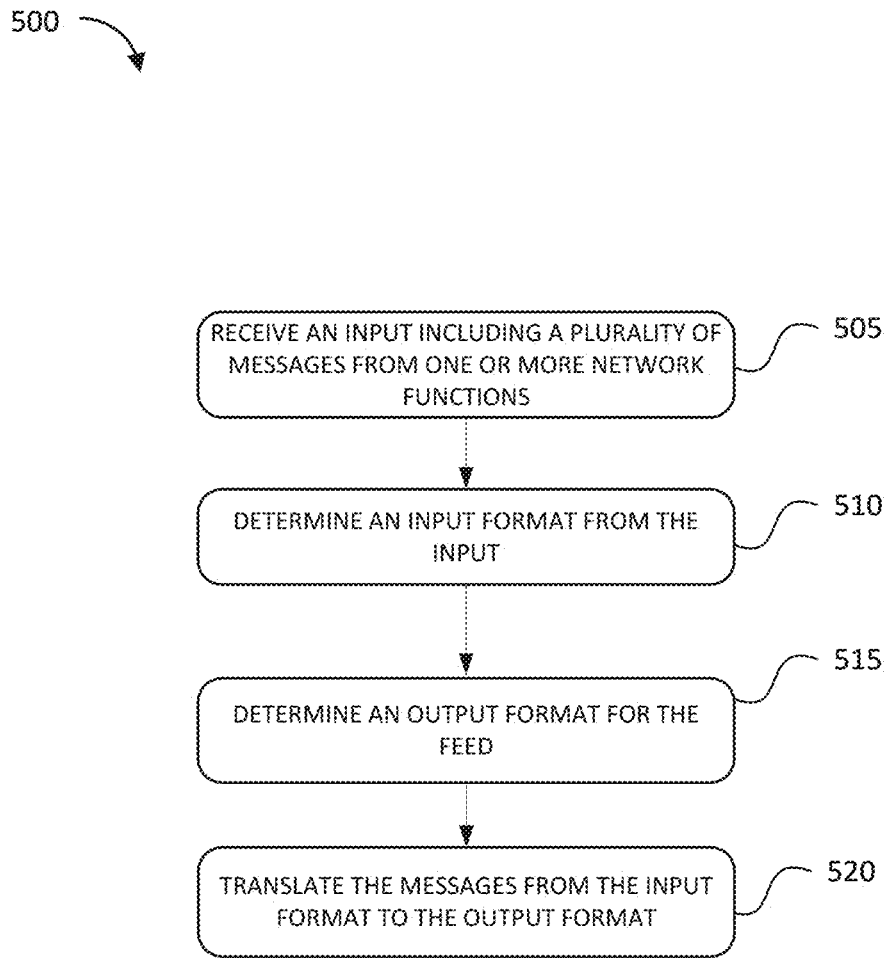
FIG. 5 illustrates an example interface handling process, in particular, a process for providing a packet encoder, according to an embodiment herein.

Referring now to FIG. 4, an example environment 400 including a PE 440 interfacing between network functions (NFs) 405 and a network monitoring system 432 is illustrated, according to an embodiment herein. For ease of explanation, FIG. 5 is described in conjunction with FIG. 4. FIG. 5 provides an example interface handling process, in particular, a process 500 for providing a packet encoder, according to an embodiment herein. Although FIG. 5 is described with reference to FIG. 4, it should be appreciated that any steps of the process 500 may be used with components and elements from any of the other figures described herein.

With reference to FIG. 4, PE 440 receives traffic 443 from one or more NFs 405 (505). The traffic 443 may be the same or similar to the communications 242 described previously or may be the same or similar to the traffic 244 described previously. Regardless of the route, the traffic 443 is received by the PE 440 from the NFs 405, which may include one or more NFs, such as PCF 106, BSF 108, UDR 110, NEF 112, NSSF 114, NRF 116, SEPP 118, and SCP 120. The traffic 443 includes one or more messages as part of communications exchanged between the NFs 405.

Upon receiving the traffic 443, the PE 440 determines an input format for incoming data as part of the traffic 443 (510). In some cases, determining the input format may simply include a determination that incoming data is received by the PE 440 as part of the traffic 443. In other cases, determining the input format may include validating that the incoming data within the traffic 443 is valid. To validate the incoming data, the PE 440 may include a data validator 450. The data validator 450 checks the accuracy and the quality of service (QoS) data before the PE 440 continues with the encoding process.

The traffic 443 may include 5G messages from the NFs 405. In particular, the messages may be or include 5G SBI messages that are transmitted by the NFs 405 through HTTP/2 protocol. As those skilled in the art readily appreciate, the emerging HTTP/2 protocol splits communications into smaller messages and frames, each of which is encoded in a binary format. Each message exchanged as part of the HTTP/2 protocol includes a HEADERs frame and a DATA frame. The HEADERs frame refers to the component of the communication protocol that contains metadata and control information. In contrast, the DATA frame contains the actual payload or user data.

The format of data within the HEADERs frame and the DATA frame causes one of the challenges encountered by CSPs when it comes to integrating 5G technologies into legacy systems, such as the network monitoring system 432, that are configured for handling 3G/4G communications. For example, the payload or user data within the DATA frame may be in an input format, such as JavaScript Object Notation (JSON). Another issue is that the data within the HEADERs frame and the DATA frame may be in a compressed format or in a multi-part format, thereby not allowing the network monitoring system 432 complete insight into the data. For example, HPACK (Header Compression for HTTP/2) may be applied to the HEADERs frame or the data within the HEADERs frame may be part of a multi-part message. If the message is part of a multi-part message, then the network monitoring system 432 may not have full insight into the message if the initial HTTP/2 messages are not captured at the beginning of an HTTP/2 session.

An advantage of the packet encoders provided herein, such as the PE 240, 340, and 440, is that they enable the network monitoring system 432 to perform monitoring on 5G communications without needing additional systems and components. As those skilled in the art readily appreciate, for the network monitoring system 432 to have insight into multi-part 5G messages, session management is required. In other words, currently for network monitoring systems 432 to monitor 5G communications, complex HTTP/2 connection or session management are needed when the 5G communications include multi-part messages. Additionally, if the 5G communication includes compressed header data, then HPACK compression support is required to provide full insight into the 5G message.

Thus, when the messages are received by the PE 404, an output format for a feed generated based on the messages is determined (515). In some cases, the output format may be a setting of the PE 404 that is selected by a CSP or a user. In other cases, the output format may be determined based on the network monitoring system 432 receiving the feed that the PE 404 generates based on the messages. The output format may depend on a variety of factors, including the input format of the messages (e.g., compressed, multipart), the receiving network monitoring system 432, and the transmission protocol of the feed 448 (e.g., TCP/IP protocol).

When a 5G message is received by the PE 440 from the NFs 405, data within the 5G message may be validated, as described above. In some cases, prior to validating the data by the data validator 450, the 5G message is first decoded depending on the input format (e.g., multipart and Gzip). As illustrated, the PE 440 includes a HEADERs frames encoder 452 and a DATA frames encoder 454. The HEADERs frame encoder 452 may be or include a device or algorithm that transforms the input format of the 5G message, specifically the format of the HEADERs frame of the 5G message, into an output format that is receivable by the network monitoring system 432. In some cases, if the 5G message includes a 5G SBI message header list in a multipart format, then the PE 440 or the HEADERs frame encoder 452 may decode the 5G message prior to processing it as multipart. Similarly, if the 5G SBI message header list indicates compression, then the PE 440 or the HEADERs frame encoder 452 may first decode the 5G message prior to further processing. The further processing may be performed based on the content-encoding (e.g., Gzip) and the content-type (e.g., multipart) in the header list.

Similarly, the Data frames encoder 454 may be a device or algorithm that transforms the input format of the 5G message. Specifically, the Data frames encoder 454 transforms the input format of the DATA frame of the 5G message into an output format that is receivable by the network monitoring system 432. For example, the HTTP/2 DATA frame of a 5G message includes data in a JSON format or a multipart encoding format. As such, the Data frames encoder 454 transforms this input format into an output format that is receivable by the network monitoring system 432. For example, the network monitoring system 432 may require data to be in a network wire format. As such, the Data frames encoder 454 may transform the input format of the data content from an input format (e.g., JSON format) into an output format (e.g., network wire format). As will be described in greater detail below, the output format may be determined based on the receiving network monitoring system 432. For example, the monitoring application 434 may require a different output format than the monitoring probe 436. As such, the PE 440 may determine an output format for a given 5G message based on the receiving network monitoring system 432.

The PE 440 also includes one or more encoders for synthesizing respective L2-L7 information, depending on the protocol stack requirements. In the illustrated example, the PE 440 includes an ethernet layer encoder 456, an IP layer encoder 458, and a TCP layer encoder 460. The ethernet layer encoder 456, the IP layer encoder 458, and the TCP layer encoder 460 represent Layer2-to-Layer7 (L2-L7) network format packet encoders. Each of these encoders 456, 458, and 460 synthesizes respective L2-L7 information into the packet that will be provided to the network monitoring system 432 via feed 448. The encoders 456, 458, and 460 synthesize the respective L2-L7 information from information received from the NFs. For example, the ethernet layer encoder 456 synthesizes the data link layer within the protocol stack, the IP layer encoder 458 synthesizes a network layer header within the protocol stack and the TCP layer encoder 460 synthesizes a transport layer header within the protocol stack based on the information within 5G message received from the NFs 405. Information within the 5G message that may be used to synthesize the L2-L7 information can include metadata, such as correlation-id, that is provided by the NFs 405. Additional metadata that may be used or maintained during the encoding process include consumer-id, producer-id, consumer-fqdn, producer-fqdn, hop-by-hop-id, reroute-cause, timestamp, message-direction, feed-source, and the like.

Once the PE 440 transforms the 5G message from the traffic 443 from an input format to an output format, the PE 440 transmits the feed 448 containing the 5G message in the output format to the network monitoring system 432. As can be appreciated, the feed 448 may contain data from more than one 5G message. In fact, the feed 448 may contain data in the output format for multiple 5G messages received from multiple NFs 405. The feed 448 may be transmitted to the network monitoring system 432 via a TCP/IP data stream. Optionally, the TCP/IP data stream is provided over TLS, depending on a necessary or desired encryption level.

Figure 6:
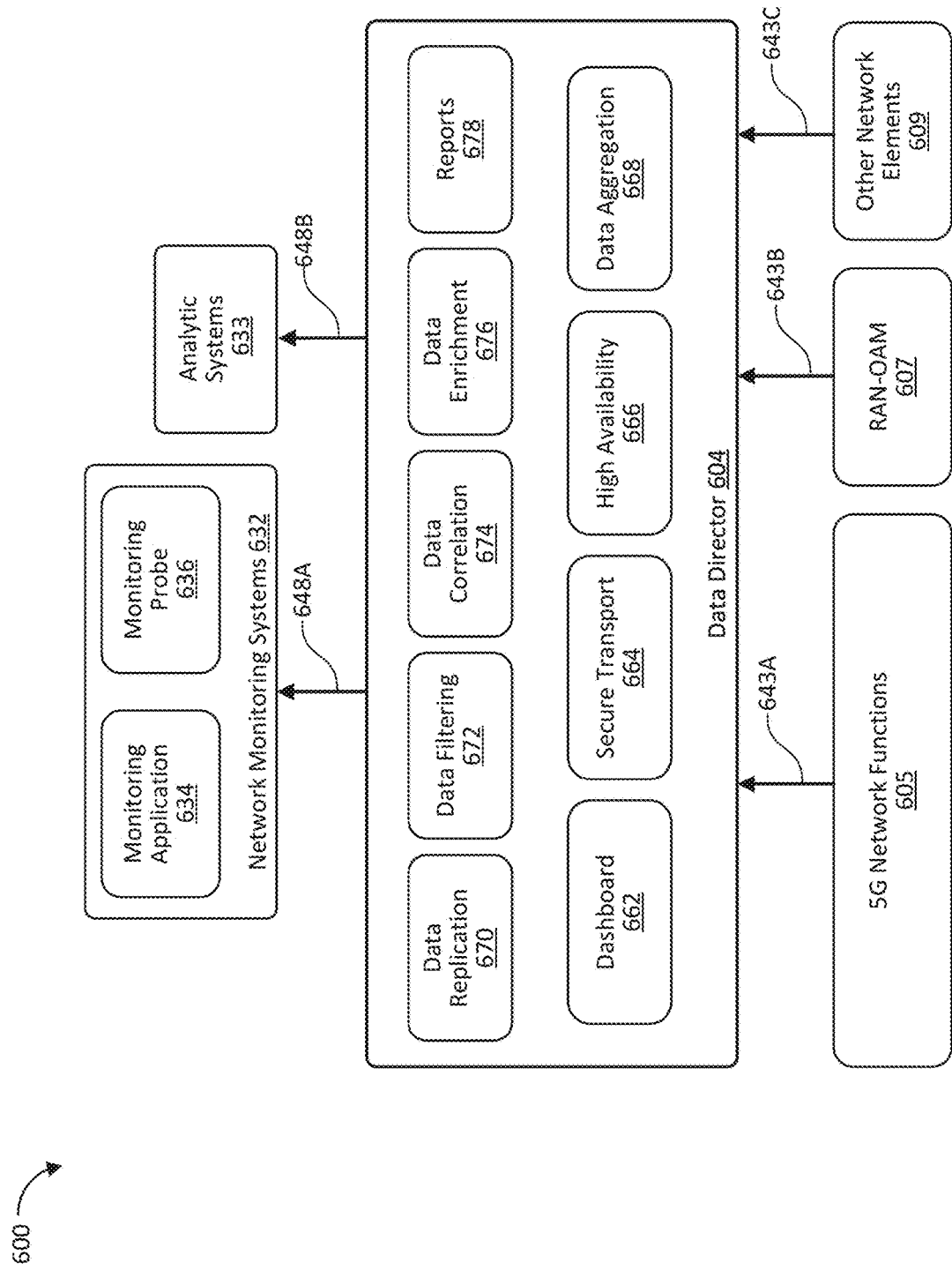
FIG. 6 illustrates an example environment including a data director (DD) interfacing between NFs and a network monitoring system, according to an embodiment herein.
Figure 7:
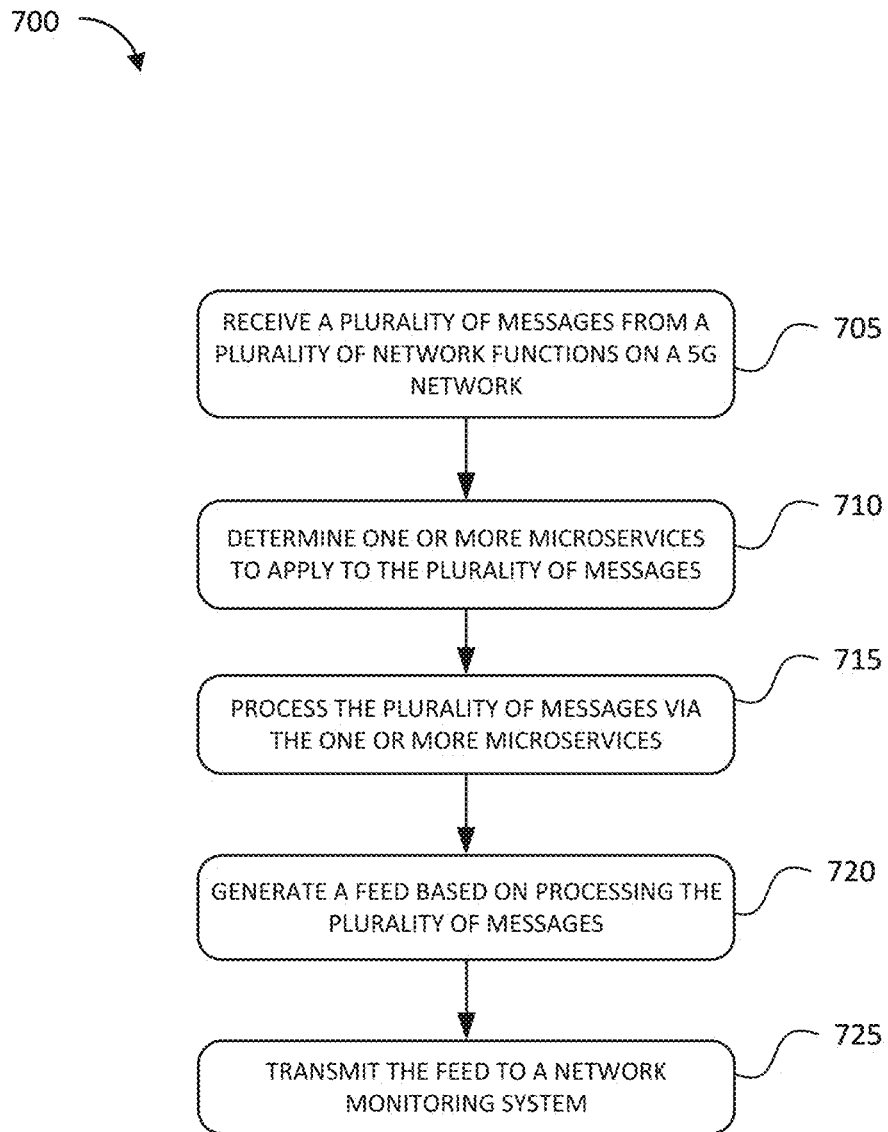
FIG. 7 illustrates an example interface handling process, in particular, a process for providing a DD for communications exchanged on a 5G network, according to an embodiment herein.

Referring now to FIG. 6, an example environment 600 including a DD 604 interfacing between NFs 605 and a network monitoring system 432 is illustrated, according to an embodiment herein. For ease of illustration, FIG. 6 is described in conjunction with FIG. 7. FIG. 7 illustrates an example interface handling process, in particular, a process for providing a DD 604 for communications exchanged on a 5G network, according to an embodiment herein. Although the process 700 of FIG. 7 is described with reference to FIG. 6, it should be appreciated that the process 700 is equally applicable to other systems and environments disclosed herein.

With reference to FIG. 6, the DD 604 receives communications 643A from 5G NFs 605, which may include a variety of NFs, such as one or more of PCF 106, BSF 108, UDR 110, NEF 112, NSSF 114, NRF 116, SEPP 118, and SCP 120 (705). The DD 604 also receives communications 643B and 643C from RAN-OAM (Radio Access Network-Operations, Administration, and Maintenance) 607 and other network elements 609, respectively. Other network elements may include 3G/4G nodes such as STP (Serving and Tracking Area Identity Register or Serving and Tracking Area Identity Pool) and DSR (Downlink Shared Resource). Each of the communications 643A-C include multiple messages that may be in a variety of input formats. For example, the communications 643A may include messages in a 5G SBI message format received via open APIs (non-standardized by 3GPP), as described above. It should be appreciated that in some cases, the DD 604 only receives communications 643A from the NFs 605, while in other cases, the DD 604 receives one or both of communications 643B-C from the RAN-OAM 607 and the other network elements 609.

As illustrated, the DD 604 generates a feed 648A, which may be the same or similar to the feed 346, to provide to the network monitoring system 632, which may be the same or similar to the network monitoring system 232 or 332. In the illustrated example, the DD 604 also generates a feed 648B for an analytic system 633. The analytic system 633 may perform further analysis on the network traffic as present in the communications 643A-C. As can be appreciated, one or both of the feeds 648A-B may be generated by the DD 604 in a given embodiment.

Upon receipt of the communications 643A, and in some cases the communications 643B-C, the DD 604 determines one or more microservices to apply to the messages within the communications 643A-C (710). The determination of which microservices to apply to the messages received as part of the communications 643A (and sometimes 643B-C) may be made based on a receiving network monitoring system 632, as described above. In some scenarios, a CSP or DD 604 user may provide a selection of microservices to apply to messages received by the DD 604 via a dashboard 662. As will be described in greater detail below with respect to FIGS. 9-11, a CSP or user can create a feed, such as feed 648A and/or feed 648B, and select what microservices to perform on the messages to create the feed.

As illustrated, the DD 604 includes one or more microservice modules for performing microservices on the incoming messages. For example, the DD 604 includes a data aggregation module 668, a data replication module 670, a data filtering module 672, a data correlation module 674, and a data enrichment module 676. Based on the determined microservices to perform on the messages, the DD 604 processes the messages using one or more microservices provided by each of the respective modules 668-676 (715). In some cases, the one or more microservice modules may be part of the analytics and processing engine 122.

In an example embodiment, as messages are received from the different NFs 605, and in some cases from RAN-OAM 607 and the other network elements 609, the data aggregation module 668 performs an aggregation microservice. For example, the data aggregation module 668 collects and aggregates messages across the separate sources. In other words, the data aggregation module 668 aggregates the messages in the network traffic into one or more feeds, depending on the needs and requirements of the CSP or user.

The data replication module 670 performs a data replication microservice on the received messages. For example, if the network monitoring system 632 includes multiple network monitoring systems 632 (e.g., multiple monitoring applications 634 and/or multiple monitoring probes 636), the data replication module 670 may replicate the messages such to provide each of the network monitoring systems 632 an individual feed. As can be appreciated, if there is more than one network monitoring systems 632 then the DD 604 generates more than one feed 648A, thereby providing at least one feed 648A to each respective network monitoring system 632.

The data filtering module 672 performs a data filtering microservice on the received messages. For example, the data filtering module 672 filters out irrelevant messages in the network traffic such to only provide the relevant traffic to the network monitoring system 632. Data may be filtered based on metadata, 5G message headers, and other parameters. In some cases, what messages are filtered out may be set or determined by a CSP or user via the dashboard 662. For example, a user may select to filter messages based on NF instance ID and transaction ID.

The data correlation module 674 performs a data correlation microservice on the received messages. For example, the data correlation module 674 correlates messages received across the communications 643A-C to determine interactions and relationships between different elements and events occurring within the network traffic.

The data enrichment module 676 performs a data enrichment microservice on the received messages. For example, the data enrichment module 676 processes the messages to enhance and expand the raw data of the messages by incorporated additional information or context into the message. For example, metadata that is received as part of the communication 643A from the NFs 605 may be incorporated into the message, as described above.

In the illustrated example, the DD 604 also includes a secure transport module 664. The secure transport module 664 applies a desired security layer to the messages within the feeds 648A-B, as selected by a CSP or user. For example, the secure transport module 664 may apply a TLS to the messages or modify the messages into an output format that includes a TLS. In other words, data streamed via one or both of the feeds 648A-B may be TLS encrypted via the secure transport module 664. As will be described in greater detail below, the secure transport module 664 may be disabled and enabled based on the network monitoring system 632 or as selected by a CSP or user.

The DD 604 may also include a high availability module 666. The high availability module 666 provides data redundancy and data reliability to the received messages and the modified messages within one or both of the feeds 648A-B. For example, the high availability module 666 may provide redundant and fault-tolerant principles to the DD 604 or provide backup systems and mechanisms for the DD 604 to ensure that seamless and uninterrupted service is provided by the DD 604 to CSPs and users.

As can be appreciated, by processing the messages by one or more of the modules 664-676, the format of the messages is transformed. For example, as received, the messages may be in an input format (e.g., 5G SBI message format). After processing one or more of the modules 664-676, the messages are in an output format, such as being in an aggregated format, filtered format, or having a TLS added to the protocol stack. Once processed, one or both of the feeds 648A-B are generated based on the processed messages (720). For example, if the messages are processed via an aggregation microservice, then the feed 648A may be an aggregation stream of messages aggregated by the aggregation module 668.

In the illustrated example, the DD 604 also includes a reports module 678. The reports module 678 may provide a health monitoring feature for the network traffic within the communications 643A-C. That is, the reports module 678 may monitor the readiness and status of the network instances and provide alerts for any service malfunction. The reports module 678 may generate reports based on its monitoring of the network traffic. For example, the reports module 678 may generate status reports, such as a report on a maximum number of replicas for service instances, a report on service state (down/up), and a report on a maximum number of CPU/memory threshold and utilization. Other metrics that may be tracked by the DD 604 may include KPIs (key performance indicators) and alerts, such as ingress MPs, egress MPs, latency between producer NF 605 and DD 604, and failure alerts.

Once one or both of the feeds 648A-B are generated, the feeds 648A-B are transmitted to the network monitoring system 632 and the analytic systems 633, respectively (715). That is, when the feed 648A is generated it is transmitted to the network monitoring system 632. And in cases where the feed 648B is generated, the feed is transmitted to the analytic system 633.

Figure 8:
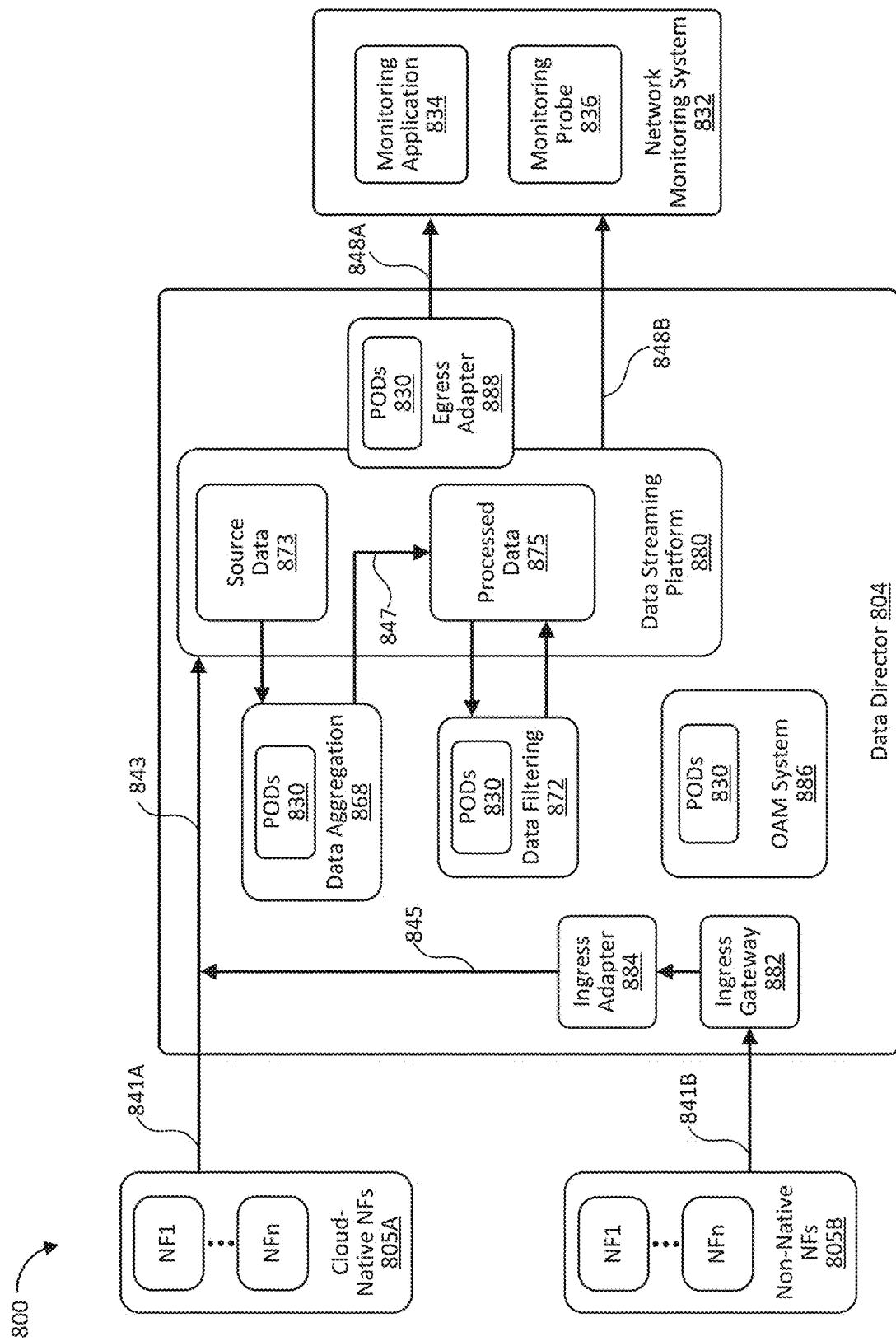
FIG. 8 illustrates an example embodiment including a DD for interfacing between a variety of NFs and a network monitoring system, according to an embodiment herein.

Referring now to FIG. 8, an example embodiment 800 including a DD 804 for interfacing between a variety of NFs 805A and 805B and a network monitoring system 832 is illustrated, according to an embodiment herein. The DD 804 may be the same or similar to the DD 604 in that the DD 804 receives one or more messages as part of communications 841A and 841B from cloud-native NFs (CNFs) 805A and non-cloud-native NFs (non-CNFs) 805B, respectively. As those skilled in the art readily appreciate, the CNFs 805A include NFs that are designed and optimized for cloud computing environments. In contrast, non-CNFs 805B may be NFs that were built for on-premise or specific hardware or dedicated appliances in data centers. Each of the NFs 805A and NFs 805B include one or more NFs: NF1-NFn. It shouldbe appreciated that in some scenarios, both NFs 805A-B may be CNFs and in other scenarios both NFs 805A-B may be non-CNFs.

Since the CNFs 805A and the non-CNFs 805B include NFs that operate in different environments, the communications 841A and 841B include messages in differing formats following different protocols. As such, the DD 804 captures the communications 841A and 841B separately before modifying the communications 841A-B into a single input for processing. That is, the communication 841A is received from the CNFs 841A as described above since the CNFs 841A include NFs within the 5G network. The communication 841B, however, may be received by the DD 804 using an ingress gateway 882. The ingress gateway 882 acts as an entry point for incoming traffic via the communication 841B from the non-CNFs 805B. As those skilled in the art readily appreciate, the ingress gateway 882 may perform one or more functions: routing, load balancing, SSL termination, authentication and authorization, traffic monitoring and logging, and path-based routing.

The DD 804 may also include an ingress adapter 884. The ingress adapter 884 may be configured to manage the messages within the communication 841B after the messages are received by the ingress gateway 882. For example, the ingress adapter 884 may manage incoming HTTP requests or other routing requests associated with the communication 841B. In other example, the ingress adapter 884 may provide the messages into a format that is receivable by a data streaming platform 880. An example data streaming platform 880 includes Apache Kafka. The data stream platform 880 may be a distributed event streaming platform that allows for building of real-time data pipelines and streaming applications. As such, the data streaming platform 880 is configured to manage large volumes of data in a fault-tolerant and scalable manner.

As illustrated, after the ingress adapter 884 modifies the communication 841B into a format that is receivable by the data streaming platform 880, the ingress adapter 884 outputs modified communication 845. The modified communication 845 is combined with the communication 841A to form a communication 843. The communication 843 may include the messages received from both the CNF 805A and the non-CNF 805B.

The communication 843 is received by the data streaming platform 880 as source data 873. The source data 873 may then be submitted to a data aggregation module 868 where all the various messages received via the communications 841A-B are aggregated into aggregated stream 847. The aggregated stream 847 is received and stored as part of processed data 875. The processed data 875 includes messages from the communications 841A-B that may have been processed via one or more microservices, such as those described above with reference to FIG. 6. For example, the processed data 875 may include messages that have been modified via a data filtering module 872. As described above, the data filtering module 872 filters messages within the communications 841A-B.

Once the messages are processed by one or more of the microservices provided by the DD 804, the data streaming platform 880 generates one or more feeds 848A-B. Each of the feeds 848A-B may be modified into a format to support various modes of delivery to the network monitoring system 832. Various modes that may be used to deliver the feeds 848A-B (e.g., modes that are receivable by the network monitoring system 832) include HTTP/2 over TLS, network wire format (TCP) over TLS, and direct Kafka feed over SASL_SSL. Depending on the mode required for delivery, an egress adapter 888 may be included in the DD 804 to generate the feed 848A in a format that is receivable by the network monitoring system 832. For example, synthetic packets may be synthesized by the egress adapter 888 and transmitted to the network monitoring system 832 over a TLS tunnel. The egress adapter 888 may also provide load balancing and distribution services for the feeds 848A-B.

In some cases, the DD 804 may include an OAM system 886. The OAM system 886 is a telecommunications management system that includes a set of tools, processes, and protocols designed to monitor, manage, and troubleshoot the operations performed by the DD 804.

Figure 9:
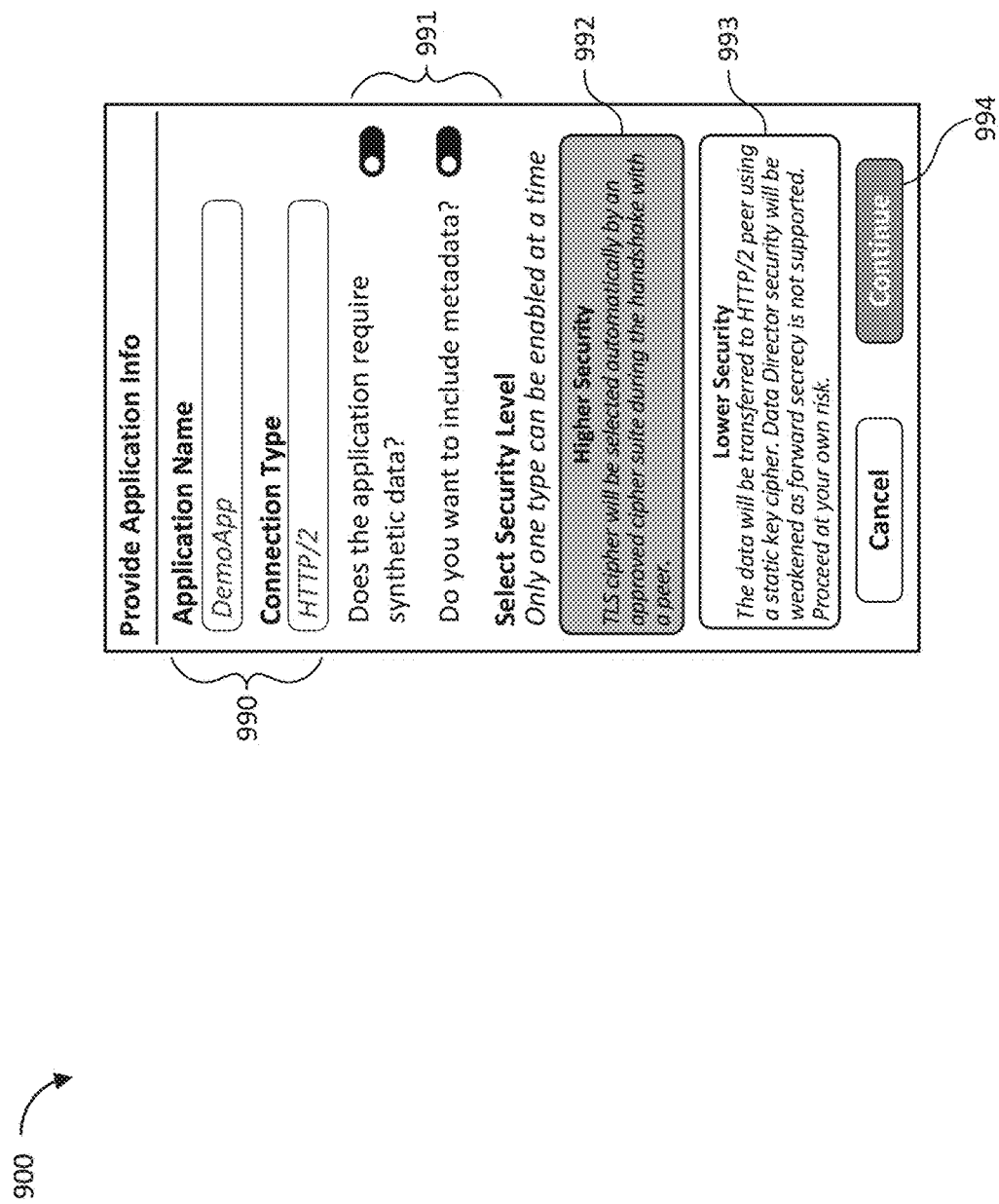
FIG. 9 illustrates a prompt for customizing a feed generated by an interface handler, according to an embodiment herein.
Figure 10:
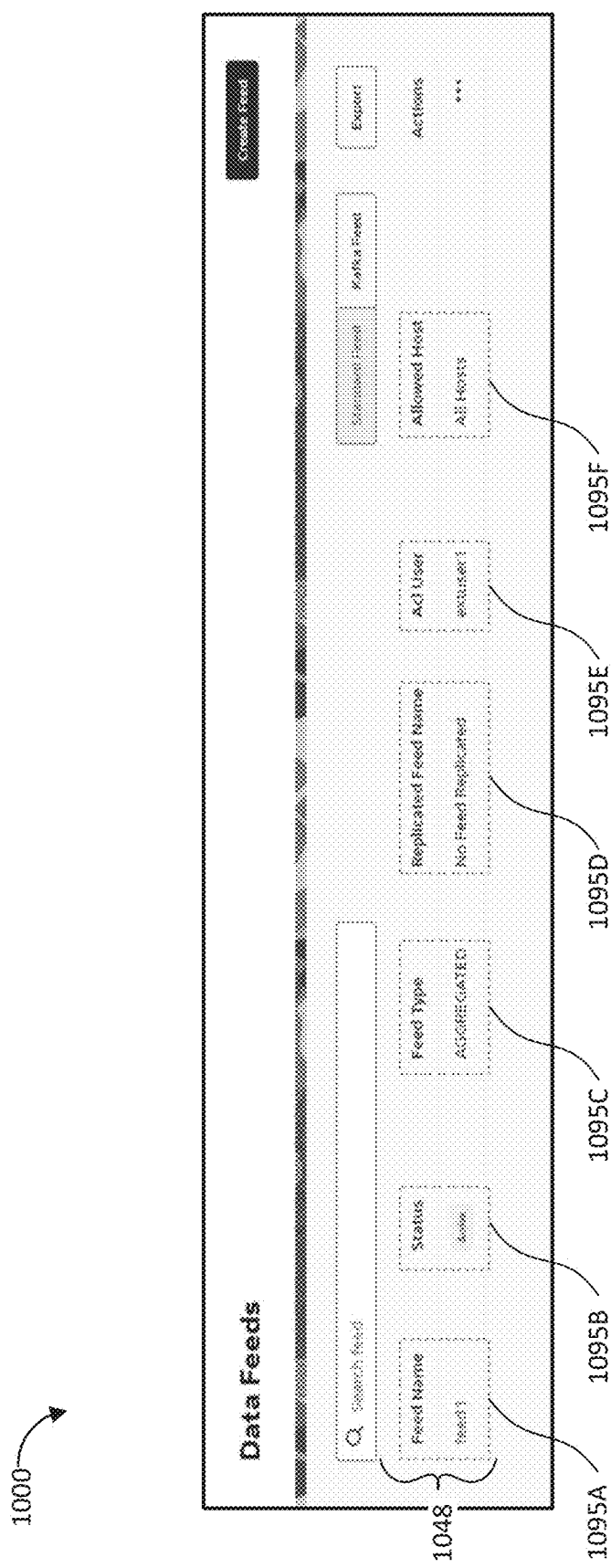
FIG. 10 illustrates a graphical user interface (GUI) providing an example feed generated by an interface handler, according to an embodiment herein.
Figure 11:
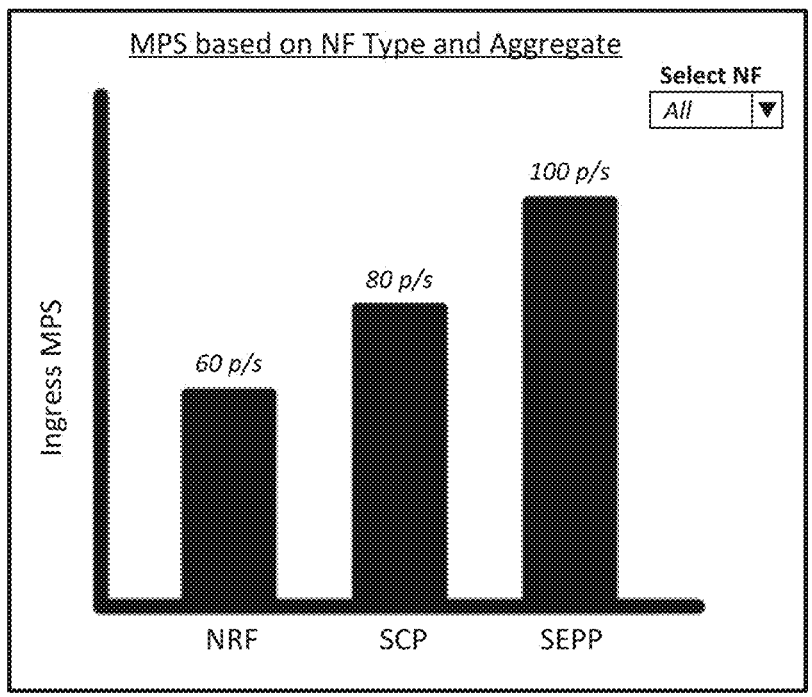
FIG. 11 illustrates various visualizations generated by a DD based on a feed generated by an interface handler, according to an embodiment herein.
Figure 11:
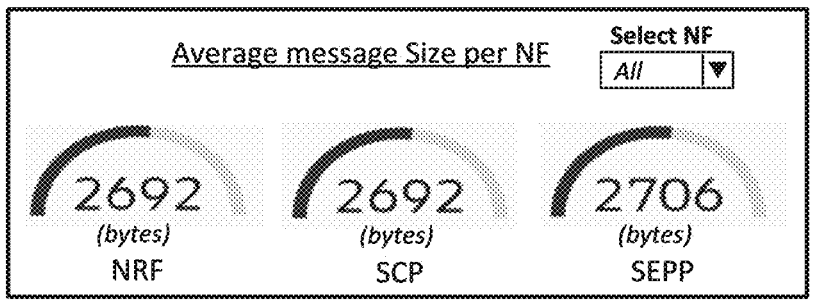
Figure 11:
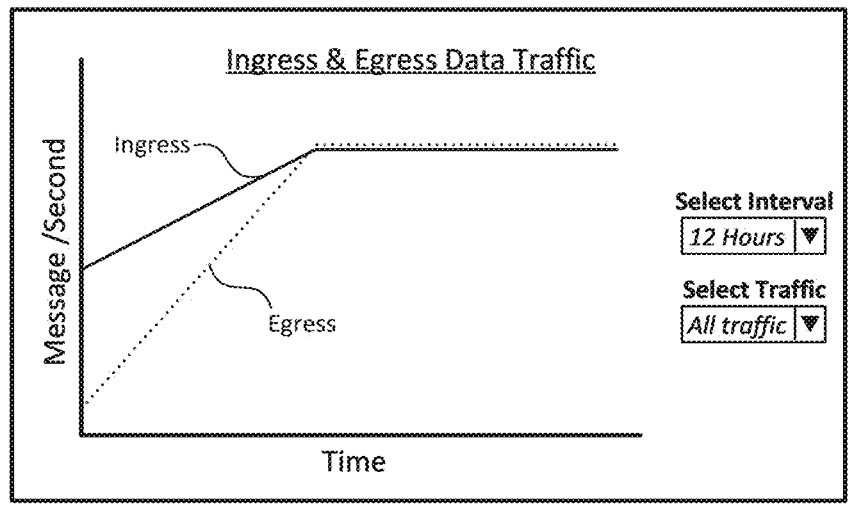

As noted above, CSPs and users may customize the feeds 848A-B according to respective network traffic via a dashboard associated with the DD 804, such as the dashboard 662. Turning now to FIG. 9-11, various displays that may be provided to a CSP or user via the dashboard 662 for customizing a feed generated by an interface handler are illustrated, according to embodiments herein.

Starting with FIG. 9, FIG. 9 provides prompt 900 for customizing a feed generated by an interface handler, such as the DD 604 or 804, according to an embodiment herein. As shown, the prompt 900 provides various fields that allow a user to customize a feed. For example, the prompt 900 includes fields 990 that allow a user to input an application name and specify a connection type, here HTTP/2. The prompt 900 also includes options 991 that allow a user to select whether the application (e.g., network monitoring system 832) requires synthetic data and if metadata should be included in the generated feed.

Additionally, the prompt 900 includes security options 992 and 993. At these options, a user can select a desired level of security or encryption method used for the feed. For example, if the user selects the option 992, then the feed will be TLS encrypted. But if the user selects the option 993, then the feed is transmitted to a HTTP/2 peer using a static key cipher instead. It should be appreciated that various types of security levels and techniques may be selected and used for the generated feed. Once the desired information is provided to the prompt 900, a user can select a continue option 994 to generate the feed.

Turning now to FIG. 10, a graphical user interface (GUI) 1000 illustrating an example feed 1048 is provided, according to an embodiment herein. The GUI 1000 provides information on an established feed 1048, which may be the same or similar to the feeds 248, 348, 448, 648 and/or 848. As illustrated, the GUI 1000 provides information on the feed 1048, including various configurations that were selected by the user via an associated dashboard, such as the dashboard 662. For example, the GUI 1000 provides feed name information 1095A, current status information 1095B, feed type information 1095C, replicated feed name information 1095D, Acl user information 1095E, and allowed host information 1095F.

As can be appreciated, the feed type information 1095C may indicate what microservices were used to process the incoming communication to generate the feed 1048. As illustrated, the feed type information 1095C indicates that the incoming communication, such as the communications 643A-C, were aggregated to generate the feed 1048. In other examples, the feed type information 1095C may indicate that the communications were filtered, correlated, or enriched.

The replicated feed name 1095D may indicate whether or not the communications were processed via a data replication module, such as the data replication module 670. For the feed 1048, the data was not replicated. However, if the communications were replicated then a user may be able to provide a name for the replicated feed.

As noted above, in some cases the DD 604 may include a reports module, such as the reports module 678, that may generate one or more reports based on the communications received by the DD 604. In addition to reports, the reports module 678 may also generate visualizations based on the communications and feeds exchanged by the DD 604. Turning now to FIG. 11, various visualizations generated by a DD are provided, according to an embodiment herein. FIG.

11 provides a chart 1100A that illustrates MPs based on NF type and aggregation. FIG. 11 also provides chart 1100B that illustrates the average message size per NP. Additionally, FIG. 11 provides graph 1100C that illustrates the ingress and egress data traffic in messages/second over time. As can be appreciated, other types of visualizations may be generated by the reports module 678 based on the network traffic (e.g., communications) received from the NFs, both native and non-native, and feeds provided to the one or more network monitoring systems. As such, the charts 1100A-B and graph 1100C are provided for illustrative purposes.

Figure 12:
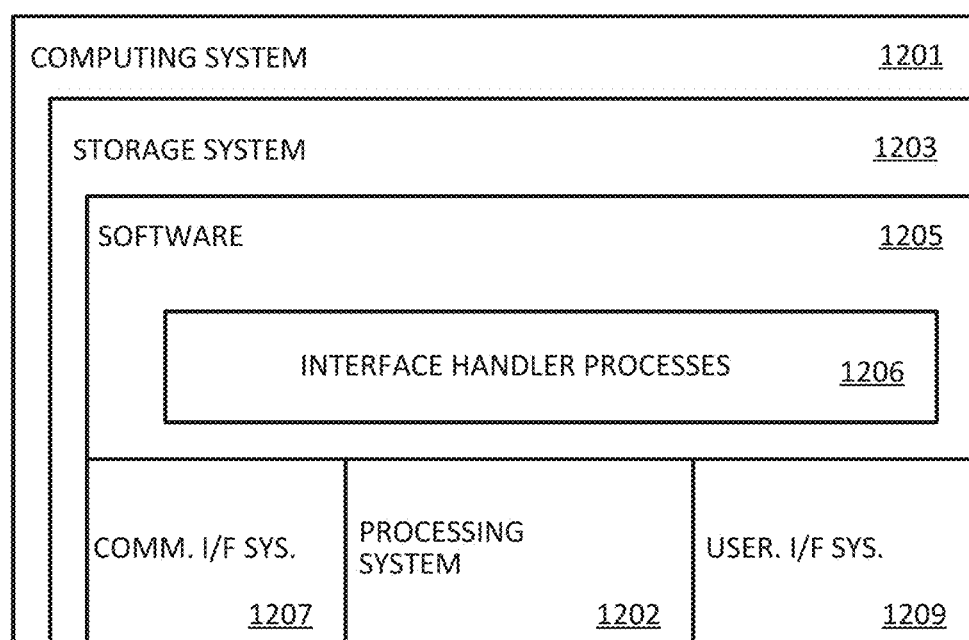
FIG. 12 shows an example computing device suitable for providing one or more interface handler functions, according to an embodiment herein.

Referring now to FIG. 12, is a diagram of a system 1200 configured to implement an interface handler, according to an embodiment herein. The system 1200 may be an example of an apparatus including a computing system 1201 that is representative of any system or collection of systems in which the various processes, systems, programs, services, and scenarios disclosed herein may be implemented. For example, computing system 1201 may be an example interface handler (e.g., DD 104, 304, 604, and 804 or the PE 240, 340, and 440), consumer NF 226 or 326, producer NF 228 or 328, or any of the subcomponents depicted in system 100 of FIG. 1. Examples of computing system 1201 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 1201 may be implemented as a single apparatus, system, or device or may be implemented in a distributed manner as multiple apparatuses, systems, or devices. Computing system 1201 may include, but is not limited to, processing system 1202, storage system 1203, software 1205, communication interface system 1207, and user interface system 1209. Processing system 1202 may be operatively coupled with storage system 1203, communication interface system 1207, and user interface system 1209.

Processing system 1202 may load and execute software 1205 from storage system 1203. Software 1205 may include interfacing handling process 1206, which may be representative of any of the operations for providing an interface handler, such as DD 104 or PE 240, as discussed with respect to the preceding figures. When executed by processing system 1202, software 1205 may direct processing system 1202 to operate as described herein for at least the various processes, such as process 500 or process 700, operational scenarios, and sequences discussed in the foregoing implementations. Computing system 1201 may optionally include additional devices, features, or functionality not discussed for purposes of brevity.

In some embodiments, processing system 1202 may comprise a micro-processor and other circuitry that retrieves and executes software 1205 from storage system 1203. Processing system 1202 may be implemented within a single processing device but may also be distributed across multiple processing devices or sub-systems that cooperate in executing program instructions. Examples of processing system 1202 may include general purpose central processing units, graphical processing units, application specific processors, and logic devices, as well as any other type of processing device, combinations, or variations thereof.

Storage system 1203 may comprise any memory device or computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device but may also be implemented across multiple storage devices or sub-systems co-located or distributed relative to each other. Storage system 1203 may comprise additional elements, such as a controller, capable of communicating with processing system 1202 or possibly other systems.

Software 1205 (including interface handling process 1206 among other functions) may be implemented in program instructions that may, when executed by processing system 1202, direct processing system 1202 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software, virtualization software, or other application software. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system as described herein. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1207 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

The foregoing examples and descriptions are described herein in the context of systems and methods for providing one or more functions of an interface handler or providing an interface handler. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a network traffic monitoring system comprising: a non-transitory computer-readable medium; and one or more processors communicatively coupled to the non-transitory computer-readable medium and configured to execute processor-executable instructions stored in the non-transitory computer-readable medium to: receive, from a plurality of network functions (NFs) in a communication exchange on a 5G network, a first plurality of messages; determine one or more microservices to apply to the first plurality of messages; process, by one or more microservice modules, the first plurality of messages using the one or more microservices; generate a feed based on processing the first plurality of messages using the one or more microservices, wherein: the first plurality of messages comprises an input format; a the feed comprises an output format; and the input format is different than the output format; and transmit, to a network monitoring system, the feed.

Example 2 is the network traffic monitoring system of any previous or subsequent Example, wherein: the network traffic monitoring system comprises one or more egress adaptors; and the one or more processors are further configured to execute processor-executable instructions stored in the non-transitory computer-readable medium to: determine, by the egress adaptor, that the network monitoring system comprises a first network monitoring system; determine, by the egress adaptor, the output format for the feed based on the first network monitoring system; and generate, by the egress adaptor, the feed comprising the output format.

Example 3 is the network traffic monitoring system of any previous or subsequent Example, wherein the processor-executable instructions stored in the non-transitory computer-readable medium are further configured to cause the one or more processors to: receive, from a client device, an input indicating the one or more microservices to perform on the first plurality of messages; generate a report based on the one or more microservices applied to the first plurality of messages; and transmit the report to the client device.

Example 4 is the network traffic monitoring system of any previous or subsequent Example, wherein: the output format comprises an encryption format; and the processor-executable instructions to generate the feed based on processing the first plurality of messages using the one or more microservices cause the one or more processors to further execute processor-executable instructions stored in the non-transitory computer-readable medium to: determine the encryption format for the feed based on the network monitoring system; encrypt the feed based on the encryption format; and transmit, to the network monitoring system, the feed in the encryption format.

Example 5 is the network traffic monitoring system of any previous or subsequent Example, wherein the processor-executable instructions to process, by the one or more microservice modules, the first plurality of messages using the one or more microservices cause the one or more processors to further execute processor-executable instructions stored in the non-transitory computer-readable medium to submit the first plurality of messages to one or more of: a data replication module; a data filtering module; a data correlation module; a data enrichment module; and a data aggregation module.

Example 6 is the network traffic monitoring system of any previous or subsequent Example, wherein: the network traffic monitoring system comprises one or more ingress adaptors; and the processor-executable instructions to receive, from the plurality of NFs in the communication exchange on the 5G network, the first plurality of messages cause the one or more processors to further execute processor-executable instructions stored in the non-transitory computer-readable medium to: receive, by the one or more ingress adaptors, an input from each of the plurality of NFs in the communication exchange on the 5G network, wherein each of the inputs comprise a plurality of data; and generate, by the one or more ingress adaptors, the first plurality of messages by aggregating the plurality of data from each of the inputs received from the plurality of NFs.

Example 7 is a method comprising: receiving, by a network traffic monitoring system, a first plurality of messages from a plurality of network functions (NFs) in a communication exchange on a 5G network; determining, by the network traffic monitoring system, one or more microservices to apply to the first plurality of messages; processing, by the network traffic monitoring system, the first plurality of messages using one or more microservices; generating, by the network traffic monitoring system, a feed based on processing the first plurality of messages using the one or more microservices, wherein: the first plurality of messages comprises an input format; the feed comprises an output format; and the input format is different than the output format; and transmitting, by the network traffic monitoring system, the feed to a network monitoring system.

Example 8 is the method of any previous or subsequent Example, the method further comprising: receiving, from a client device, an input indicating the one or more microservices to perform on the first plurality of messages; generating, by the network traffic monitoring system, a report based on the one or more microservices applied to the first plurality of messages; and transmitting, by the network traffic monitoring system, the report to the client device.

Example 9 is the method of any previous or subsequent Example, the method further comprises: determining, by the network traffic monitoring system, that the network monitoring system is a first network monitoring system based on the first plurality of messages; receiving, by the network traffic monitoring system, a second plurality of messages from a second plurality of NFs in the communication exchange on the 5G network; determining, by the network traffic monitoring system, a second network monitoring system for the second plurality of messages, wherein the second network monitoring system is different than the first network monitoring system; processing, by the network traffic monitoring system, the first plurality of messages using a first group of microservices based on the first network monitoring system; and processing, by the network traffic monitoring system, the second plurality of messages using a second group of microservices based on the second network monitoring system.

Example 10 is the method of any previous or subsequent Example, wherein the network monitoring system comprises a monitoring probe and wherein processing, by the network traffic monitoring system, the first plurality of messages using the one or more microservices comprises: generating, by a data enrichment module of the network traffic monitoring system, one or more synthetic packets.

Example 11 is the method of any previous or subsequent Example, wherein processing, by the network traffic monitoring system, the first plurality of messages using the one or more microservices comprises: filtering, by a data filtering module of the network traffic monitoring system, the first plurality of messages based on metadata of the first plurality of messages.

Example 12 is the method of any previous or subsequent Example, wherein processing, by the network traffic monitoring system, the first plurality of messages using the one or more microservices comprises: correlating, by a data correlation module of the network traffic monitoring system, data within the first plurality of messages with respective data.

Example 13 is the method of any previous or subsequent Example, wherein processing, by the network traffic monitoring system, the first plurality of messages using the one or more microservices comprises: replicating, by a data replication module of the network traffic monitoring system, the first plurality of messages to generate a copy of the first plurality of messages.

Example 14 is the method of any previous or subsequent Example, wherein processing, by the network traffic monitoring system, the first plurality of messages using the one or more microservices comprises: aggregating, by a data aggregation module of the network traffic monitoring system, related data within the first plurality of messages received from separate NFs of the plurality of NFs into a group of aggregated data.

Example 15 is the method of any previous or subsequent Example, wherein processing, by the network traffic monitoring system, the first plurality of messages using the one or more microservices comprises: enriching, by a data enrichment module of the network traffic monitoring system, the first plurality of messages to generate a plurality of enriched data, wherein: the first plurality of messages comprise a first format; the plurality of enriched data comprise a second format; and the first format is different than the second format.

Example 16 is a non-transitory computer-readable medium comprising processor-executable instructions configured to cause one or more processors to: receive, from a plurality of network functions (NFs) in a communication exchange on a 5G network, a first plurality of messages; determine one or more microservices to apply to the first plurality of messages; process, by one or more microservice modules, the first plurality of messages using the one or more microservices; generate a feed based on processing the first plurality of messages using the one or more microservices, wherein: the first plurality of messages comprises an input format; the feed comprises an output format; and the input format is different than the output format; and transmit, to a network monitoring system, the feed.

Example 17 is the non-transitory computer-readable medium of any previous or subsequent Example, wherein: the input format comprises a first encryption format and the output format comprises a second encryption format; and the processor-executable instructions stored in the non-transitory computer-readable medium are further configured to cause the one or more processors to: decrypt the first plurality of messages prior to processing the first plurality of messages using the one or more microservices; and encrypt the feed based on the second encryption format prior to transmitting the feed to the network monitoring system.

Example 18 is the non-transitory computer-readable medium of any previous or subsequent Example, wherein the processor-executable instructions stored in the non-transitory computer-readable medium are further configured to cause the one or more processors to: receive, from a client device, an input indicating the one or more microservices to perform on the first plurality of messages; generate a report based on the one or more microservices applied to the first plurality of messages; and transmit the report to the client device.

Example 19 is the non-transitory computer-readable medium of any previous or subsequent Example, wherein the one or more microservices comprises at least one of: a data replication microservice; a data filtering microservice; a data correlation microservice; a data enrichment microservice; and a data aggregation microservice.

Example 20 is the non-transitory computer-readable medium of any previous or subsequent Example, wherein the processor-executable instructions stored in the non-transitory computer-readable medium are further configured to cause the one or more processors to: determine an encryption format for the feed based on the network monitoring system; encrypt the feed based on the encryption format; and transmit, to the network monitoring system, the feed in the encryption format.

Example 21 is a packet encoder comprising: a non-transitory computer-readable medium; and one or more processors communicatively coupled to the non-transitory computer-readable medium and configured to execute processor-executable instructions stored in the non-transitory computer-readable medium to: receive, from one or more network functions (NFs) in a communication exchange on a 5G network, an input comprising plurality of messages; determine an input format from the input; determine an output format for a feed generated based on the plurality of messages; translate the plurality of messages from the input format to the output format, wherein: the input format is different than the output format; and the feed comprising the plurality of messages in the output format; and transmit the feed to a network monitoring system.

Example 22 is the packet encoder of any previous or subsequent Example, wherein: the input format comprises JavaScript Object Notation (JSON) data format that is structured for transmission over a hypertext transfer protocol/2 (HTTP/2) data stream; the output format comprises network wire format that is structured for transmission over a transmission control protocol (TCP) and an internet protocol (IP) data stream; and the processor-executable instructions to translate the plurality of messages from the input format to the output format cause the one or more processors to further execute processor-executable instructions stored in the non-transitory computer-readable medium to translate the plurality of messages from the JSON data format into the network wire format.

Example 23 is the packet encoder of any previous or subsequent Example, the processor-executable instructions to determine the output format for the feed generated based on the plurality of messages cause the one or more processors to further execute processor-executable instructions stored in the non-transitory computer-readable medium to: determine data information from the plurality of messages; synthesize network wire information based on the data information; and insert the network wire information into the output format.

Example 24 is the packet encoder of any previous or subsequent Example, wherein the processor-executable instructions cause the one or more processors to further execute processor-executable instructions stored in the non-transitory computer-readable medium to transmit the feed to the network monitoring system.

Example 25 is the packet encoder of any previous or subsequent Example, wherein the input is encrypted; and the processor-executable instructions cause the one or more processors to further execute processor-executable instructions stored in the non-transitory computer-readable medium to decrypt the input as the input is received.

Example 26 is the packet encoder of any previous or subsequent Example, wherein: the plurality of messages in the input are in a compressed state; and the processor-executable instructions to receive, from the one or more NFs in a communication exchange on the 5G network, the input comprising plurality of messages cause the one or more processors to further execute processor-executable instructions stored in the non-transitory computer-readable medium to: decompress the plurality of messages when received in the input.

Example 27 is the packet encoder of any previous or subsequent Example, wherein the processor-executable instructions cause the one or more processors to further execute processor-executable instructions stored in the non-transitory computer-readable medium to: receive, from one or more second network functions (NFs) in a communication exchange on a non-5G network, a second input comprising a second plurality of messages; determine a second input format from the second input; translate the second plurality of messages from the second input format to the output format, wherein: the second input format is different than the output format; and the feed comprising the second plurality of messages in the output format; and transmit the feed to the network monitoring system.

Example 28 is a method comprising: receiving, by a packet encoder, an input comprising plurality of messages from one or more network functions (NFs) in a communication exchange on a 5G network; determining, by the packet encoder, an input format from the input; determining, by the packet encoder, an output format for a feed generated based on the plurality of messages; translating, by the packet encoder, the plurality of messages from the input format to the output format, wherein: the input format is different than the output format; and the feed comprising the plurality of messages in the output format; and transmitting the feed to a network monitoring system.

Example 29 is the method of any previous or subsequent Example, wherein: the input comprises hypertext transfer protocol/2 (HTTP/2) data stream; the feed comprises a transmission control protocol (TCP) data stream; and translating the plurality of messages from the input format to the output format comprises translating the plurality of messages from an HTTP/2 format into a network wire format.

Example 30 is the method of any previous or subsequent Example, wherein the network monitoring system comprises a third-party monitoring probe.

Example 31 is the method of any previous or subsequent Example, wherein the packet encoder comprises a cloud-native application.

Example 32 is the method of any previous or subsequent Example, wherein the packet encoder is part of a packet broker.

Example 33 is the method of any previous or subsequent Example, wherein the packet encoder is part of a service controller proxy.

Example 34 is the method of any previous or subsequent Example, wherein the packet encoder is part of a network repository function.

Example 35 is the method of any previous or subsequent Example, wherein determining the output format for the feed generated based on the plurality of messages further comprises: determining data information from the plurality of messages, wherein the data information comprises a HEADERS frame and a DATA frame; synthesizing network wire information based on the data information; and inserting the network wire information into the output format.

Example 36 is a non-transitory computer-readable medium comprising processor-executable instructions configured to cause one or more processors to: receive, from one or more network functions (NFs) in a communication exchange on a 5G network, an input comprising plurality of messages; determine an input format from the input; determine an output format for a feed generated based on the plurality of messages; translate the plurality of messages from the input format to the output format, wherein: the input format is different than the output format; and the feed comprising the plurality of messages in the output format; and transmit the feed to a network monitoring system.

Example 37 is the non-transitory computer-readable medium of any previous or subsequent Example, wherein: the input format comprises a first encryption format and the output format comprises a second encryption format; and the processor-executable instructions stored in the non-transitory computer-readable medium are further configured to cause the one or more processors to: decrypt the plurality of messages prior translating the plurality of messages from the input format to the output format; and encrypt the feed based on the second encryption format prior to transmitting the feed to the network monitoring system.

Example 38 is the non-transitory computer-readable medium of any previous or subsequent Example, wherein the processor-executable instructions to determine the output format for the feed generated based on the plurality of messages further cause the one or more processors to further execute processor-executable instructions stored in the non-transitory computer-readable medium to: determine data information from the plurality of messages, wherein the data information comprises a HEADERS frame and a DATA frame; synthesize network wire information based on the data information; and insert the network wire information into the output.

Example 39 is the non-transitory computer-readable medium of any previous or subsequent Example, wherein: the input format comprises JavaScript Object Notation (JSON) data format that is structured for transmission over a hypertext transfer protocol/2 (HTTP/2) data stream; the output format comprises network wire format that is structured for transmission over a transmission control protocol (TCP) and an internet protocol (IP) data stream; and the processor-executable instructions to translate the plurality of messages from the input format to the output format cause the one or more processors to further execute processor-executable instructions stored in the non-transitory computer-readable medium to translate the plurality of messages from the JSON data format into the network wire format.

Example 40 is the non-transitory computer-readable medium of any previous or subsequent Example, wherein the processor-executable instructions stored in the non-transitory computer-readable medium are further configured to cause the one or more processors to: determine an encryption format for the feed based on the network monitoring system; encrypt the feed based on the encryption format; and transmit, to the network monitoring system, the feed in the encryption format.

What is claimed is:

1. A packet encoder comprising:
a non-transitory computer-readable medium; and
one or more processors communicatively coupled to the non-transitory computer-readable medium and configured to execute processor-executable instructions stored in the non-transitory computer-readable medium to:
receive, from one or more network functions (NFs) in a communication exchange on a 5G network, an input comprising plurality of messages;
determine an input format from the input, wherein the input format comprises a first communication protocol and a first serialization format;
determine an output format for a feed generated based on the plurality of messages, wherein the output format comprises a second communication protocol and a second serialization format;
translate the plurality of messages from the input format to the output format, wherein:
the input format is different than the output format; and
the feed comprising the plurality of messages is in the output format; and
transmit the feed to a network monitoring system.

2. The packet encoder of claim 1, wherein:
the first serialization format comprises JavaScript Object Notation (JSON) and is structured for transmission over a data stream in the first communication protocol, wherein the first communication protocol comprises a hypertext transfer protocol/2 (HTTP/2);
the second serialization format comprises network wire format and is structured for transmission over a data stream in the second communication protocol, wherein the second communication protocol comprises a transmission control protocol (TCP) and an internet protocol (IP); and
the processor-executable instructions to translate the plurality of messages from the input format to the output format cause the one or more processors to further execute processor-executable instructions stored in the non-transitory computer-readable medium to translate the plurality of messages from the JSON data format into the network wire format.

3. The packet encoder of claim 1, the processor-executable instructions to determine the output format for the feed generated based on the plurality of messages cause the one or more processors to further execute processor-executable instructions stored in the non-transitory computer-readable medium to:
determine data information from the plurality of messages;
synthesize network wire information based on the data information; and
insert the network wire information into the output format.

4. The packet encoder of claim 1, wherein the processor-executable instructions cause the one or more processors to further execute processor-executable instructions stored in the non-transitory computer-readable medium to transmit the feed to the network monitoring system.

5. The packet encoder of claim 1, wherein the input is encrypted; and the processor-executable instructions cause the one or more processors to further execute processor-executable instructions stored in the non-transitory computer-readable medium to decrypt the input as the input is received.

6. The packet encoder of claim 1, wherein:
the plurality of messages in the input are in a compressed state; and
the processor-executable instructions to receive, from the one or more NFs in a communication exchange on the 5G network, the input comprising plurality of messages cause the one or more processors to further execute processor-executable instructions stored in the non-transitory computer-readable medium to: decompress the plurality of messages when received in the input.

7. The packet encoder of claim 1, wherein the processor-executable instructions cause the one or more processors to further execute processor-executable instructions stored in the non-transitory computer-readable medium to:
receive, from one or more second network functions (NFs) in a communication exchange on a non-5G network, a second input comprising a second plurality of messages;
determine a second input format from the second input, wherein the second comprises a third communication protocol and a third serialization format;
translate the second plurality of messages from the second input format to the output format, wherein:
the second input format is different than the output format; and
the feed comprising the second plurality of messages in the output format; and
transmit the feed to the network monitoring system.

8. A method comprising:
receiving, by a packet encoder, an input comprising plurality of messages from one or more network functions (NFs) in a communication exchange on a 5G network;
determining, by the packet encoder, an input format from the input, wherein the comprises a first communication protocol and a first serialization format;
determining, by the packet encoder, an output format for a feed generated based on the plurality of messages, wherein the output format comprises a second communication protocol and a second serialization format;
translating, by the packet encoder, the plurality of messages from the input format to the output format, wherein:
the input format is different than the output format; and
the feed comprising the plurality of messages in the output format; and
transmitting the feed to a network monitoring system.

9. The method of claim 8, wherein:
the first communication protocol of the input comprises hypertext transfer protocol/2 (HTTP/2) data stream;
the second communication protocol of the feed comprises a transmission control protocol (TCP) data stream; and
translating the plurality of messages from the input format to the output format comprises translating the plurality of messages from an HTTP/2 format into a network wire format.

10. The method of claim 8, wherein the network monitoring system comprises a third-party monitoring probe.

11. The method of claim 8, wherein the packet encoder comprises a cloud-native application.

12. The method of claim 8, wherein the packet encoder is part of a packet broker.

13. The method of claim 8, wherein the packet encoder is part of a service controller proxy.

14. The method of claim 8, wherein the packet encoder is part of a network repository function.

15. The method of claim 8, wherein determining the output format for the feed generated based on the plurality of messages further comprises:
determining data information from the plurality of messages, wherein the data information comprises a HEADERS frame and a DATA frame;
synthesizing network wire information based on the data information; and
inserting the network wire information into the output format.

16. A non-transitory computer-readable medium comprising processor-executable instructions configured to cause one or more processors to:
receive, from one or more network functions (NFs) in a communication exchange on a 5G network, an input comprising plurality of messages;
determine an input format from the input, wherein the comprises a first communication protocol and a first serialization format;
determine an output format for a feed generated based on the plurality of messages, wherein the output format comprises a second communication protocol and a second serialization format;
translate the plurality of messages from the input format to the output format, wherein:
the input format is different than the output format; and
the feed comprising the plurality of messages in the output format; and
transmit the feed to a network monitoring system.

17. The non-transitory computer-readable medium of claim 16, wherein:
the comprises a first encryption format and the output format comprises a second encryption format; and
the processor-executable instructions stored in the non-transitory computer-readable medium are further configured to cause the one or more processors to:
decrypt the plurality of messages prior to translating the plurality of messages from the input format to the output format; and
encrypt the feed based on the second encryption format prior to transmitting the feed to the network monitoring system.

18. The non-transitory computer-readable medium of claim 16, wherein the processor-executable instructions to determine the output format for the feed generated based on the plurality of messages further cause the one or more processors to further execute processor-executable instructions stored in the non-transitory computer-readable medium to:
determine data information from the plurality of messages, wherein the data information comprises a HEADERS frame and a DATA frame;
synthesize network wire information based on the data information; and
insert the network wire information into the output.

19. The non-transitory computer-readable medium of claim 16, wherein:
the first serialization format comprises JavaScript Object Notation (JSON) and is structured for transmission over a data stream in the first communication protocol, wherein the first communication protocol comprises a hypertext transfer protocol/2 (HTTP/2);
the second serialization format comprises network wire format and is structured for transmission over a data stream in the second communication protocol, wherein the second communication protocol comprises a transmission control protocol (TCP) and an internet protocol (IP); and
the processor-executable instructions to translate the plurality of messages from the input format to the output format cause the one or more processors to further execute processor-executable instructions stored in the non-transitory computer-readable medium to translate the plurality of messages from the JSON data format into the network wire format.

20. The non-transitory computer-readable medium of claim 16, wherein the processor-executable instructions stored in the non-transitory computer-readable medium are further configured to cause the one or more processors to:
- determine an encryption format for the feed based on the network monitoring system;
- encrypt the feed based on the encryption format; and
- transmit, to the network monitoring system, the feed in the encryption format.

* * * * *